United States Patent
Zhang et al.

(10) Patent No.: US 12,278,570 B2
(45) Date of Patent: Apr. 15, 2025

(54) DC-DC CONVERTER ASSEMBLY

(71) Applicant: Lithium Balance A/S, Smorum (DK)

(72) Inventors: Zhe Zhang, Lyngby (DK); Kasper Luthje Jorgensen, Lyngby (DK)

(73) Assignee: Lithium Balance A/S, Smorum (DK)

( * ) Notice: Subject to any disclaimer, the term of this patent is extended or adjusted under 35 U.S.C. 154(b) by 75 days.

(21) Appl. No.: 17/919,469

(22) PCT Filed: Apr. 16, 2021

(86) PCT No.: PCT/EP2021/059941
§ 371 (c)(1),
(2) Date: Oct. 17, 2022

(87) PCT Pub. No.: WO2021/209613
PCT Pub. Date: Oct. 21, 2021

(65) Prior Publication Data
US 2023/0155515 A1    May 18, 2023

(30) Foreign Application Priority Data

Apr. 16, 2020  (EP) .................................... 20169765
Jun. 22, 2020  (EP) .................................... 20181458

(51) Int. Cl.
H02M 3/335    (2006.01)
H02M 3/00     (2006.01)
H02M 7/12     (2006.01)

(52) U.S. Cl.
CPC ......... H02M 3/33584 (2013.01); H02M 3/01 (2021.05); H02M 3/33571 (2021.05); H02M 3/33573 (2021.05); H02M 7/12 (2013.01)

(58) Field of Classification Search
CPC ......... H02M 3/33584; H02M 3/33573; H02M 3/33571; H02M 3/01; H02M 7/12
See application file for complete search history.

(56) References Cited

U.S. PATENT DOCUMENTS

| | | | |
|---|---|---|---|
| 5,623,398 A | 4/1997 | Beach et al. | |
| 7,042,199 B1 | 5/2006 | Birchenough | |
| 7,116,568 B1 | 10/2006 | Birchenough | |
| 10,128,756 B2 * | 11/2018 | Zhang ................. | H02M 3/1582 |
| 10,629,875 B2 | 4/2020 | Choi et al. | |

(Continued)

FOREIGN PATENT DOCUMENTS

WO    WO2019076874 A1    4/2019

OTHER PUBLICATIONS

Albert et al., "Analysis and Comparison of dc/dc Topologies in Partial Power Processing Configuration for Energy Storage Systems," Proceedings of 2018 International Power Electronics Conference, 2018, 8 pages.

(Continued)

*Primary Examiner* — Gary L Laxton
(74) *Attorney, Agent, or Firm* — Lee & Hayes, P.C.

(57) ABSTRACT

A DC-DC converter assembly includes a DC-DC power converter. A converter load is electrically connected between a positive input and a positive output (or negative input and negative output) of the DC-DC converter such that a DC input voltage source of the assembly supplies load power directly to the converter load without passing through the DC-DC power converter.

17 Claims, 17 Drawing Sheets

(56) References Cited

U.S. PATENT DOCUMENTS

2012/0212203 A1    8/2012   Harrison
2019/0165665 A1    5/2019   Dai

OTHER PUBLICATIONS

Button et al., "An Advanced Photovoltaic Array Regulator Module," NASA Technical Memorandum 107304, IECEC—96424, 1996, 12 pages.
Iyer et al., "Extreme Fast Charging Station Architecture for Electric Vehicles with Partial Power Processing," Applied Power Electronics Conference and Exposition (apee), Annual Ieee Conference, p. 659-665, 2019.
The PCT Search Report and Written Opinion mailed Jul. 22, 2021 for PCT application No. PCT/EP2021/059941, 4 pages.
Xue et al., "Fractional Converter for High Efficiency High Power Battery Energy Storage System," IEEE Energy Conversion Congress and Exposition, p. 5144-5150, 2017.

\* cited by examiner

DC-DC CONVERTER ASSEMBLY

CROSS-REFERENCE TO RELATED APPLICATIONS

This application is the National Stage of International Application No. PCT/EP2021/059941, filed Apr. 16, 2021, which claims priority to EP patent application Ser. No. 20/181,458.9, filed Jun. 22, 2020 and EP patent application No. 20169765.3, filed Apr. 16, 2020. The entirety of each of the applications listed above is incorporated herein by reference.

The present invention relates to a DC-DC converter assembly which comprises a DC-DC power converter configured to convert a DC input voltage, supplied by a DC input voltage source, into a DC output voltage in accordance with a modulated control signal. A converter load electrically connected in series with the DC-DC power converter and the latter comprises a configurable switch network configured to switch the DC-DC power converter between first and second operational modes.

BACKGROUND OF THE INVENTION

Active and passive components of existing DC-DC power converters are subjected to large voltage and current stresses and large heat dissipation caused by flow of power through the power converter and into the converter load. This reduces reliability and lifetime of DC-DC power converters, in particular high power converters, and/or requires costly active and passive components that can withstand the high currents and/or voltages. Hence, it is desirable to reduce the current stress and/or voltage stress of active and passive components of DC-DC converters of DC-DC converter assemblies for a given or nominal load power. Another disadvantage of existing DC-DC converter assemblies that uses series connection of the converter load and DC-DC power converter is a lacking support of converter load voltages that are both smaller and larger than DC input voltage of the DC-DC power converter. The latter feature requires that the DC-DC power converter is configured or designed to generate both positive and negative the DC output voltages, and also zero for that matter, as discussed in additional detail below.

SUMMARY OF THE INVENTION

A first aspect of the invention relates to a DC-DC converter assembly which comprises a DC-DC power converter configured to convert a DC input voltage supplied by a DC input voltage source into a DC output voltage in accordance with at least first and second modulated control signals,
  a converter load electrically connected in series with the DC-DC power converter such that the DC input voltage source supplies power directly to the converter load without passing through the DC-DC power converter; said DC-DC power converter comprising:
  a control circuit configured to adjust the DC output voltage or current in accordance with a target DC voltage or a DC target current, respectively,
  a configurable switch network configured to switch the DC-DC power converter between:
  a first operational mode for generating a DC output voltage of a first polarity using a first current charge path and first current discharge path of the configurable switch network to provide a converter load voltage smaller than the DC input voltage, and
  a second operational mode for generating a DC output voltage of a second polarity, opposite to the first polarity, using a second current charge path and second current discharge path of the configurable switch network to provide a converter load voltage that is larger than the DC input voltage.

By connecting the converter load of the converter assembly in series with the DC-DC power converter, the DC input voltage source may supply a majority of the power delivered into the converter load, for example more than 50%, or more than 66%, or even the substantially entire load power, directly to the converter load. This feature serves to markedly reduce the amount of power that is converted or processed by, i.e. flowing through, the DC-DC power converter for a given or power delivery to the converter load. The ratio between the power supplied directly to the converter load by the DC input voltage source and the power flowing through the DC-DC converter depends on a difference between the desired converter load voltage and the DC input voltage where a small voltage difference leads to large portion of the converter load is delivered directly by the DC input voltage source as discussed below with reference to under the appended drawings.

For mains connected applications, the DC input voltage may lie between 320 V and 800 V—for example higher than 565 V. The DC output voltage may be smaller than one-fifth or one-tenth of the DC input voltage for example about 48 V for rechargeable battery pack loads. The load power may be larger than 10 kW or larger than 50 kW.

The control circuit may comprise, or form a component or function of, a voltage or current output regulation loop, e.g. based on feedback, that is configured to adjust the DC output voltage, Vout, or DC output current in accordance with the respective target DC voltage or current, the DC input voltage and DC output voltage. The output regulation loop ensures that the DC output voltage or current is dynamically adjusted to maintain a desired or target converter load voltage or current. The output regulation loop ensures that a voltage drop across the converter load is relatively constant and well defined. The control circuit may apply various known control mechanisms to the voltage or current output regulation loop such as pulse width modulation (PWM), phase shift modulation (PSM) or frequency modulation (FM) of the modulated control signal applied to the configurable switch network.

In some embodiments, the control circuit is configured to switch the configurable switch network between the first operational mode and second operational mode depending on anyone of the polarity of the DC output voltage, the target DC voltage, the target DC current, the DC input voltage and DC output voltage.

In some embodiments, the configurable switch network comprises a plurality of interconnected individually controllable semiconductor switches configured to:
  during the first operational mode:
    selectively charge an inductor from the DC output voltage through a first controllable semiconductor switch in accordance with the first modulated control signal ($\phi 1$) and discharge the inductor into the input of the DC-DC power converter through a second controllable semiconductor switch in accordance with the second, and complimentary, modulated control signal ($\phi 2$);
    placing a third controllable semiconductor switch constantly in a non-conducting state; and
  during the second operational mode:

placing the first and second controllable semiconductor switches constantly in a conducting state and non-conducting state, respectively, charge the inductor from the DC input voltage through the third controllable semi-conductor switch in accordance with the one of the first or second complimentary modulated control signals ($\phi1$, $\phi2$) and discharge the inductor into the first or second polarity output of the DC-DC power converter in accordance with the other one of first and second complimentary modulated control signals.

The control circuit may comprise a modulator, e.g. pulse width modulator, configured to generate at least the first or second complimentary modulated control signals ($\phi1$, $\phi2$) at respective outputs of first and second comparators of the modulator. The modulator preferably comprises:

a carrier signal generator configured to generate first and second mutually offset carrier signals at a switching frequency of the DC-DC power converter. The first comparator may have a first input connected to the first carrier signal and second input connected to a dynamic reference signal and the second comparator may have a first input connected to the second carrier signal and a second input connected to the dynamic reference signal. The control circuit is preferably configured to switch between first and second operational modes by adjusting a voltage or level of the dynamic reference signal as explained in additional detail below with reference to the appended drawings.

The characteristics of the dynamic reference signal may be utilized to set or determine a maximum duty cycle value, e.g. below 90% or below 95%, of the first and/or second complimentary modulated control signals and likewise may be utilized set a minimum duty cycle value, e.g. larger than 5% or 10%, of the first and/or second complimentary modulated control signals as discussed in additional detail below with reference to the appended drawings.

The control circuit may for example be configured to adjust the voltage or level of the dynamic reference signal at a predetermined control frequency $f_z$, within a predetermined intermediate output voltage region around 0 V of the DC-DC power converter. The control frequency $f_z$, may be at least 3 or 5 times smaller, e.g. between 5 and 10 or times smaller, than the switching frequency of the DC-DC power converter. Hence, if the switching frequency of the DC-DC power converter is 100 kHz, the control frequency $f_z$ is preferably smaller than 33.3 kHz.

In some embodiments, the DC-DC power converter comprises:
at least one capacitor connected between the positive input and positive output of the DC-DC power converter; or
an input capacitor connected between the positive input and negative input of the DC-DC power converter and an output capacitor connected between the positive output and negative output of the DC-DC power converter.

In some embodiments, the DC-DC power converter comprises:
at least one capacitor connected between the positive input and positive output of the DC-DC power converter; or
an input capacitor connected between the positive input and negative input of the DC-DC power converter and an output capacitor connected between the positive output and negative output of the DC-DC power converter.

In some embodiments, the configurable switch network is electrically connected between an input and an output of the DC-DC power converter.

In some embodiments, the configurable switch network further comprises:
a first passive diode connected in series with the inductor and the first controllable semiconductor switch between the positive and negative outputs of the DC-DC power converter to provide, during the first and second operational modes, a first charge path for charging the inductor in accordance with the first modulated control signal ($\phi1$);
a second passive diode coupled in series with the inductor and the second controllable semiconductor switch to the positive input the DC-DC power converter to provide, during at least the first operational mode, the first discharge path for discharging the inductor in accordance with the second modulated control signal ($\phi2$).

In some embodiments, the configurable switch network further comprises:
a first active diode, for example comprising a fourth controllable semiconductor switch, connected in series with the inductor and the first controllable semiconductor switch between the positive and negative outputs of the DC-DC power converter to provide, during the first and second operational modes, a first charge path for charging the inductor in accordance with first modulated control signal ($\phi1$);
a second active diode, for example comprising a fifth controllable semiconductor switch, coupled in series with the inductor and the second controllable semiconductor switch to the positive input the DC-DC power converter to provide, during at least the first operational mode, a first discharge path for discharging the inductor during the second phase ($\phi2$) of the modulated control signal.

In some embodiments, the DC-DC power converter further comprises:
a resonant DC-DC converter stage coupled in series with the positive input the DC-DC power converter and configured to step-up the DC input voltage with a predetermined boost factor.

In some embodiments, the resonant DC-DC converter stage comprises:
a first full-bridge or half-bridge rectifier coupled between the DC input voltage of the DC-DC power converter and a primary side winding of a transformer;
a second full-bridge or half-bridge rectifier coupled between a secondary side winding of the transformer and the input voltage of the configurable switch network.

In some embodiments, at least one of the converter load and the DC input voltage source comprises an inverter, e.g. AC-DC converter, or a battery pack with a plurality of rechargeable battery cells.

In some embodiments, the converter load comprises and the DC input voltage source comprises an inverter, e.g. AC-DC converter, connectable to a single phase mains grid or a three phase mains grid.

In some embodiments, the DC-DC power converter is configured for bidirectional operation to additionally transfer power from the converter load directly to the DC input voltage source without passing through the power DC-DC converter.

A second aspect of the invention relates to a method of supplying power to a converter load of a DC-DC converter assembly using a DC-DC power converter, comprising:
- connecting a DC input voltage source to an input of the DC-DC power converter to provide a DC input voltage thereto,
- adjusting a DC output voltage or current at the output of the DC-DC power converter by a control circuit in accordance with the DC input voltage, the DC output voltage and a target DC voltage or target DC current, respectively;
- selectively switching a configurable switch network of the DC-DC power converter between:
- a first operational mode for generating a first polarity DC output voltage to provide a converter load voltage smaller than the DC input voltage; and
- a second operational mode for generating a second polarity, opposite to the first polarity, DC output voltage to provide a converter load voltage larger than the DC input voltage.

In some embodiments, the method further comprises:
- during the first operational mode: charge an inductor from the DC output voltage through a first controllable semiconductor switch in accordance with a first modulated control signal ($\phi 1$) and discharge the inductor into the input of the DC-DC power converter in accordance with a second, and complimentary, modulated control signal ($\phi 2$);
- switching a third controllable semiconductor switch constantly to a non-conducting state; and
during the second operational mode: maintain the first and second controllable semiconductor switches constantly in a conducting state and non-conducting state, respectively,
- charge the inductor from the DC input voltage through the third controllable semiconductor switch in accordance with the first modulated control signal ($\phi 1$) and discharge the inductor, through the negative output, into the first or second polarity output of the DC-DC power converter in accordance with the second modulated control signal ($\phi 2$).

BRIEF DESCRIPTION OF THE DRAWINGS

Preferred embodiments of the invention are described in more detail in the following in connection with the appended drawings, in which.

DETAILED DESCRIPTION OF PREFERRED EMBODIMENTS

Figure 1:
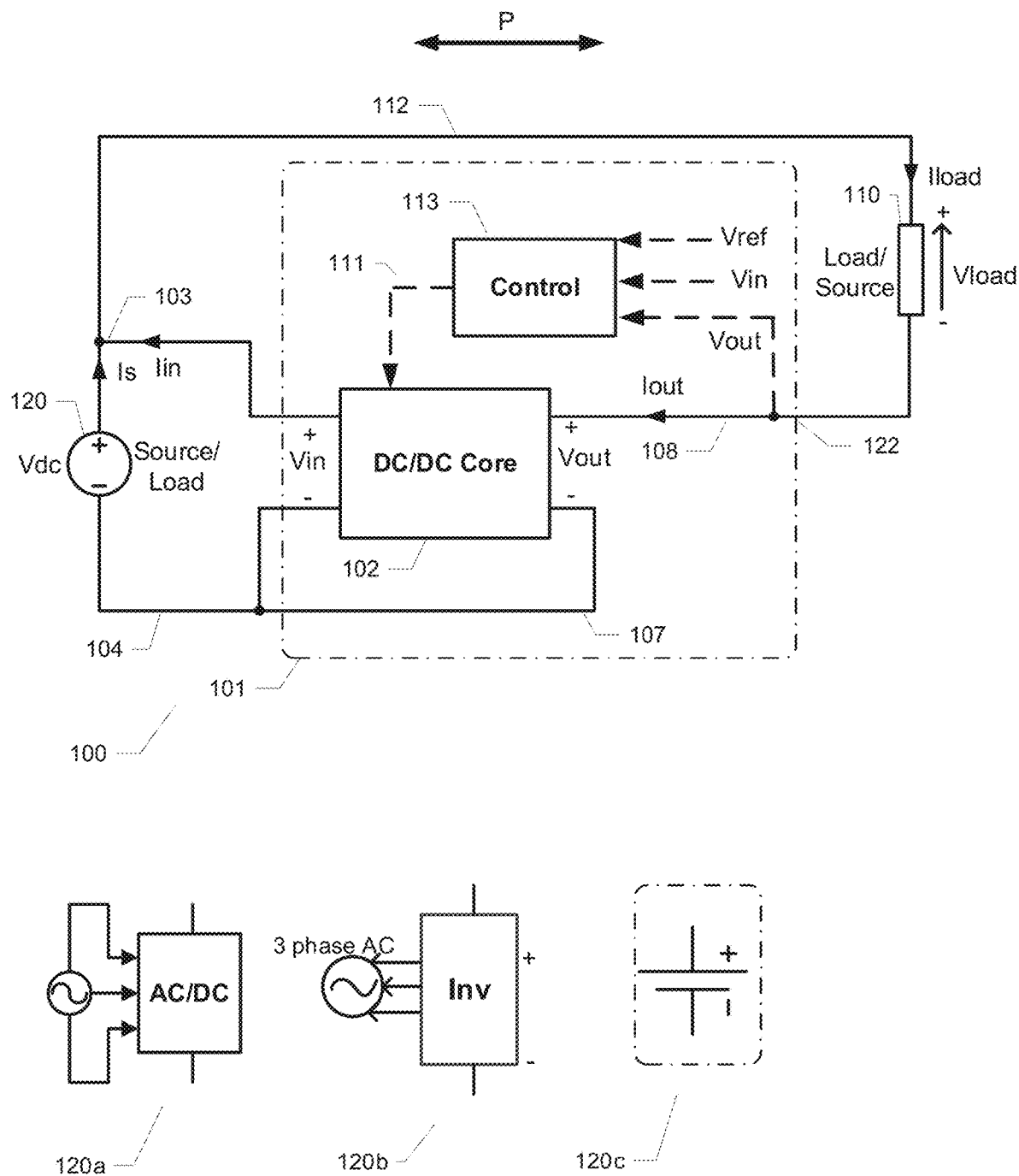
FIG. 1 is a block diagram of an exemplary DC-DC converter assembly in accordance with various embodiments of the invention, FIG. 1A schematically illustrates different exemplary embodiments of a DC-DC converter assembly as disclosed herein.

The following section describes various exemplary embodiments of the present DC-DC converter assembly with reference to the appended drawings. The skilled person will understand that the accompanying drawings are schematic and simplified for clarity and therefore merely show details which are essential to the understanding of the invention, while other details have been left out. Like reference numerals refer to like elements or components throughout. Like elements or components will therefore not necessarily be described in detail with respect to each figure. The skilled person will further appreciate that certain actions and/or steps may be described or depicted in a particular order of occurrence while those skilled in the art will understand that such specificity with respect to sequence is not actually required.

FIG. 1 shows a schematic diagram of an exemplary DC-DC converter assembly 100 in accordance with the invention. The DC-DC converter assembly 100 comprises a DC-DC power converter 101 which converts a certain portion or percentage of a load power supplied to a converter load 110 (Load/Source), while a DC input voltage source or current source 120 (Source/Load) supplies the residual portion of the load power directly to the converter load 110 without passing through the DC-DC power converter 101.

The direct supply of load power to the converter load 110 is achieved because the converter load 110 is electrically connected between a positive input 103 and positive output 108 of the DC-DC power converter 101—for example via an electrical wire or conductor 112. This load connection arrangement connects the converter load 110 in series with the DC-DC power converter 101 instead of the traditional parallel connection of the converter load to the positive and negative outputs 108, 107. In some embodiments of the DC-DC converter assembly 100, the load power delivered directly to the converter load 110 by the DC input voltage source 120 may be markedly larger than the load power delivered by DC-DC power converter 101—for example at least 2, 3, 5 or 10 times larger depending on design details, requirements to the converter load voltage and the DC input voltage supplied by DC input voltage source 120 and certain performance requirements of the DC-DC converter assembly 100.

The reduction of power delivery by the DC-DC power converter 101 may leads to considerable reduction in size and costs of the DC-DC power converter 101 at a specified load power. The reduced power delivery requirements to the DC-DC power converter 101 entail further advantages such as increased reliability because voltage stress and heat dissipation of active and passive components of the DC-DC core 102 are reduced and component costs are reduced. The overall energy/power efficiency of the DC-DC converter assembly 100 is also increased because the DC-DC power converter 101 converts less power and accordingly reduces power losses within the converter core 102. The DC input voltage source 120 is preferably connected between a positive input 103 and negative input 104 of the DC-DC power converter 101. The negative input 104 may for example be connected to a ground potential of the DC converter assembly 100 and a negative output 107 also connected to the ground potential.

The DC-DC power converter 101 additionally comprises a control circuit 113 configured to adjust the DC output voltage, Vout, at the output terminal 122 in accordance with a target DC voltage, Vref, or equivalent adjusting a DC output current, or output power, flowing through the output terminal 122 in accordance with a target DC current. The control circuit 113 preferably forms a component or function of a voltage or current feedback regulation loop that is configured to adjust the DC output voltage, Vout, or DC output current in accordance with the respective target DC voltage or current 111c, the current DC input voltage Vin and current DC output voltage Vout. The control circuit 113 generates a set of control signals 111 which controls the respective state switchings of a plurality of controllable semiconductor switches of the DC/DC core and sets a switching frequency of the DC-DC power converter 101, for example a frequency between 10 kHz to 1 MHz as discussed in additional detail below. The skilled person will understand that control circuit may use various types of modulation of the modulated control signal or signals 111 such as pulse width modulation (PWM), PSM, PDM or FM.

The target DC voltage, Vref, preferably represents a desired converter load voltage, Vload, and the control circuit 113 is configured to monitor or determine the DC output voltage, Vout, and the DC input voltage, Vin, to make appropriate adjustment of the converter load voltage, Vload, because the latter voltage is the difference between Vin and Vout due to the series connection of the converter load 110 and the DC-DC power converter 101 in the converter assembly 100. The control circuit 113 is preferably configured to seamlessly and dynamically, under normal operation of the assembly 100, switch between the first operational mode and the second operational mode of the power converter 101 depending on a target converter load voltage Vload and the current DC input voltage Vin.

The skilled person will appreciate that some embodiments of the DC-DC power converter 101 may be unidirectional where power only can be transferred from the source 120 to the converter load 110. Such unidirectional DC-DC converters may comprise a passive rectification circuit. Alternative embodiments of the DC-DC converter 101 may be bidirectional enabling power transfer from the source 120 to the load 110 and vice versa depending on a suitable control mechanism applied to an active rectification circuit on the secondary side as described in additional detail below. In the latter embodiments, the skilled person will understand that the role of the DC input voltage source 120 and the converter load 110 in practice may be interchanged when the DC-DC power converter 101 operates in reverse mode where the DC input voltage source 120, as indicated by the "Load" designation receives power from the converter load 110 which therefore also is indicated as "Source". This feature is particularly advantageous for example where the converter load, or the DC input voltage source 120, comprises a battery pack 120c, e.g. including a plurality of rechargeable battery cells. In the latter embodiment, energy stored in the battery cells may be supplied to the converter load, e.g. an AC motor of an EV, and energy generated by the AC motor in reverse operation e.g. a regenerative mode, may be used to charge the battery cells. The DC input voltage source may comprise a two-phase or three-phase grid-connected inverter 120a and/or the converter load 110 may comprise an energy storage unit such as a rechargeable battery stack or package comprising a plurality of series connected rechargeable battery cells or a fuel cell etc. The converter load 110 may alternatively comprise a regenerative fuel cell (RFC) or a grid-connected inverter such that the grid acts as a converter load and the energy storage unit may deliver power/energy to the grid for example for grid stabilization purposes or deliver power/energy to AC loads such as dishwashers or washing machines.

The absolute value of the DC output voltage Vout, as set by the control circuit 113, may be significant smaller than the absolute value of the DC input voltage, Vdc, supplied by the DC input voltage source 120 at the positive and negative inputs 103, 104, of the DC-DC power converter 101. This feature ensures that the majority of the load power is supplied by the DC input source 120 as illustrated by the quantitative example below.

One exemplary embodiment of the DC-DC converter assembly 100 may be designed or constructed using the following constraints and target performance:

TABLE 1

| Vdc > Vload | Vdc < Vload |
| --- | --- |
| Vdc = 50 V | Vdc = 46 V |
| Vload = 48 V | Vload = 48 V |
| Pload: = 1 kW | Pload: = 1 kW |
| Iload = 1 kW/48 V = 20.83 A | Iload = 1 kW/48 V = 20.83 A |
| Vout = Vdc − Vload = 50 V − 48 V = 2 V | Vout = Vdc − Vload = 46 V − 48 V = −2 V |
| Iout = Iload = 20.83 A | Iout = Iload = 20.83A |
| Pconverter = Vout * Iout = 2 V * 20.83 A = 41.67 W | Pconverter = Vout * Iout = −2 V * 20.83 A = 41.67 W |
| Fsw = 100 kHz. | |
| Inductance of Inductor L = 1 microH | |

Consequently, in the above design example of the DC-DC converter assembly 100 the DC input voltage source Vdc supplies about 958 W directly to the converter load 110 while the residual 42 W of the total 1 kW load power is supplied by the DC-DC power converter 101. Hence, demonstrating a marked reduction of power supplied by or through the DC-DC power converter 101 compared to conventional solutions where the converter load is coupled in parallel to the output of DC-DC power converter 101.

The skilled person will understand that the design specification of the above-mentioned exemplary embodiment of the DC-DC converter assembly 100 requires that the DC-DC power converter 101 is configured to, or capable of, generating a positive DC output voltage Vout in order to supply a converter load voltage Vload that is smaller than the DC input voltage, equal to Vdc, of the DC-DC power converter 101. However, the design specification additionally requires that the DC-DC power converter 101 is configured to, or capable of, generating a negative DC output voltage Vout in order to supply a converter load voltage Vload that is larger than the DC input voltage, equal to Vdc, of the DC-DC power converter 101. This feature implies that the DC-DC power converter 101 is capable of operating in boost mode as well as buck mode which on one hand improves the flexibility of the converter assembly 100 and on the other hand for certain cases, the rated power of the DC-DC power converter 101 can be halved compared to a corresponding power converter which only functions where the converter load voltage Vload is smaller than the DC input voltage. Several DC-DC power converter embodiments or topologies with this advantageous boost mode and buck mode capability is discussed below in detail.

Figure 1A:
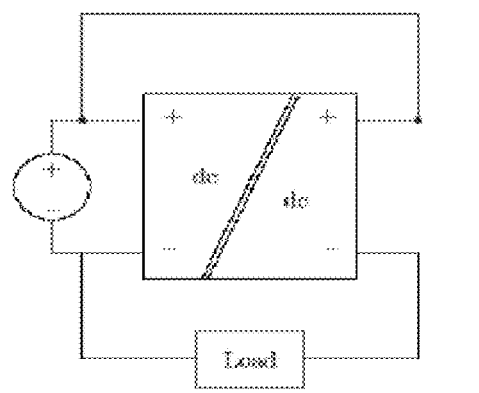
Figure 1A:
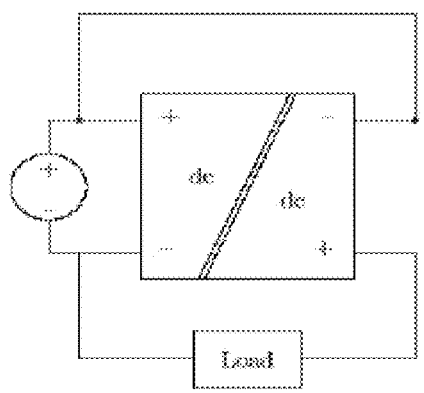
Figure 1A:
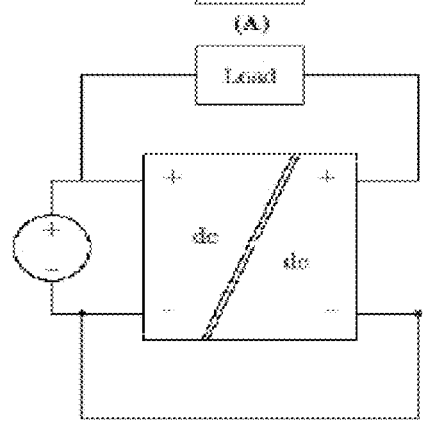
Figure 1A:
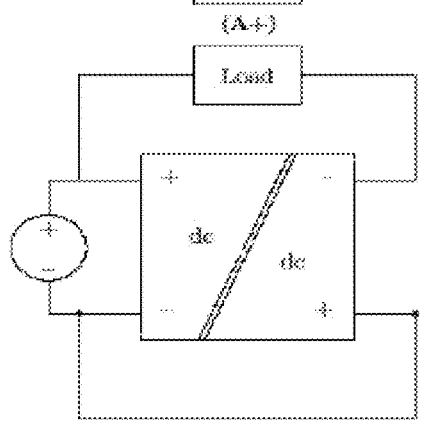
Figure 1A:
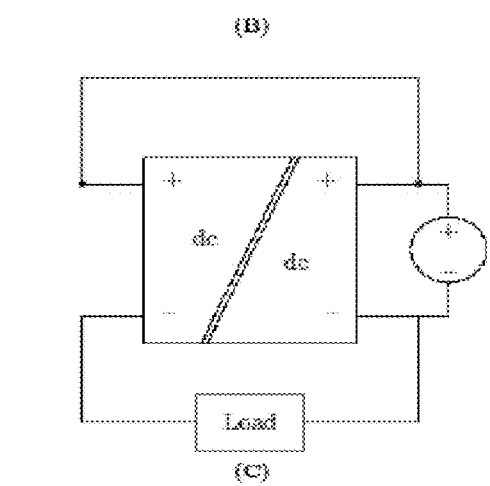
Figure 1A:
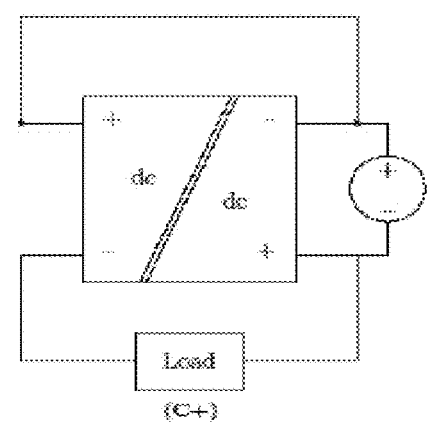
Figure 1A:
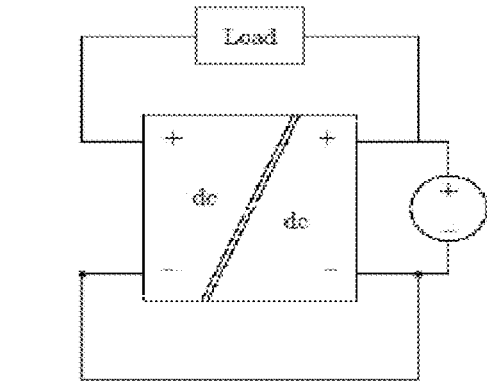
Figure 1A:
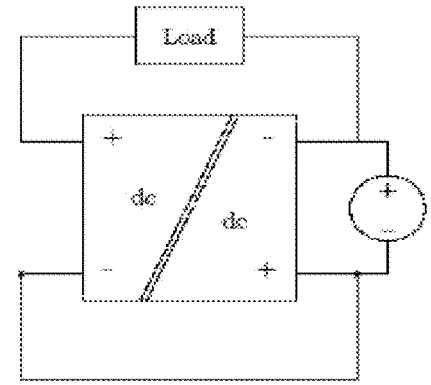

FIG. 1A schematically illustrates different exemplary embodiments of a DC-DC converter assembly as disclosed herein. Shown are four different exemplary serial couplings between power converter and load.

Figure 2:
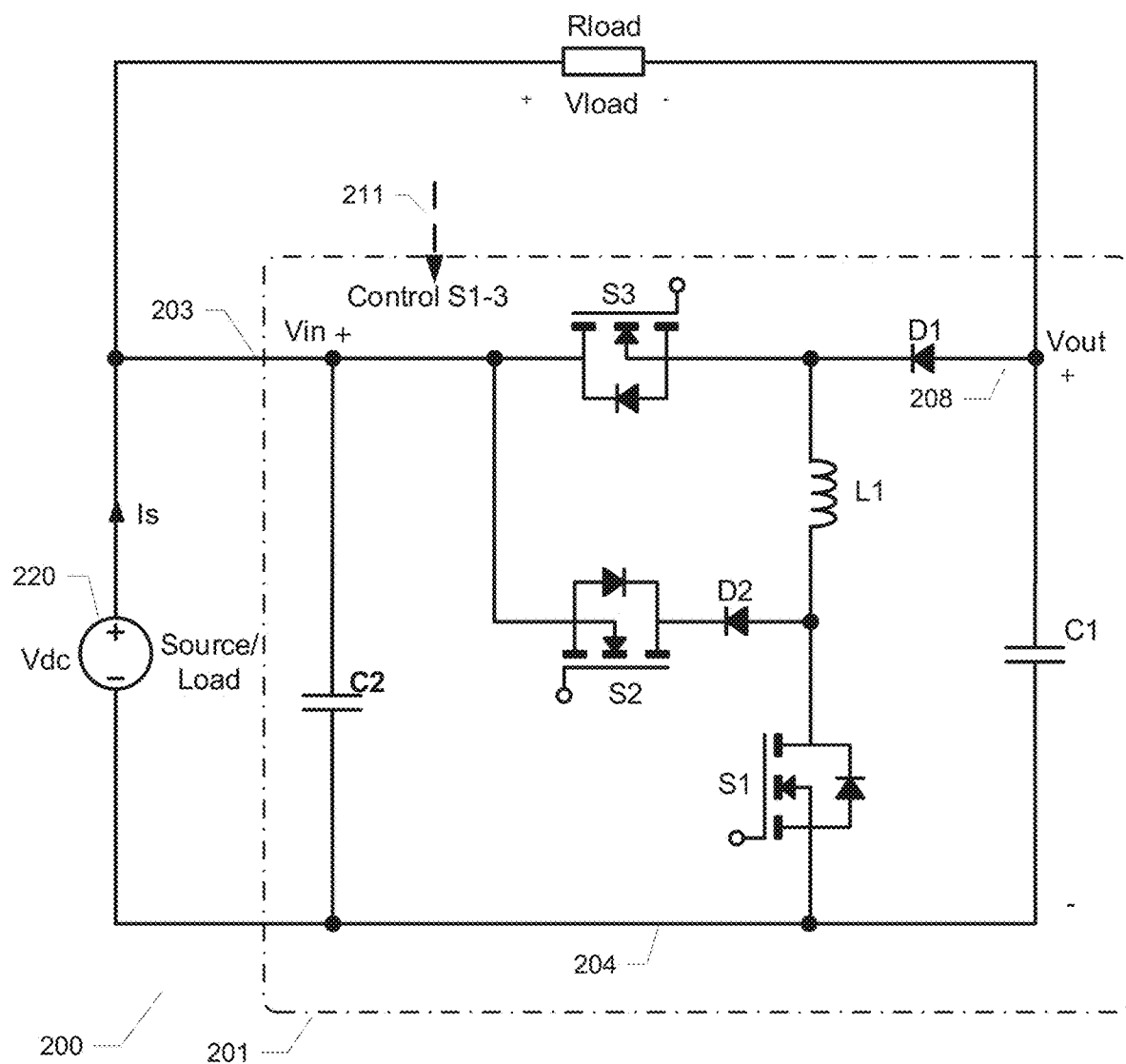
FIG. 2 shows a schematic circuit diagram of a first embodiment of a DC-DC power converter of the DC-DC converter assembly.

FIG. 2 shows a simplified circuit diagram of a first embodiment of the DC-DC power converter 101 of the DC-DC converter assembly 100 without details of the control circuit 113 for brevity. The converter load, Rload, and DC input voltage source/generator Vdc associated with the converter assembly 200 are included as well to clarify the interconnections. The DC-DC power converter 201 comprises a configurable switch network electrically connected between the positive input Vin+ and the positive output, Vout+, of the DC-DC power converter 201. The configurable switch network comprises a plurality of interconnected individually controllable semiconductor switches S1, S2 and S3 that are switched between conducting and non-conducting states, i.e. between on and off, by respective control signals Control S1-3 connected to respective gate, or similar device control terminals, supplied by the previously discussed control circuit via a bus or set of wires 211 of the power converter 101. Each of the controllable semiconductor switches S1, S2 and S3 may comprise a bipolar transistor or a FET such as a MOSFET or an IGBT. The configurable switch network comprises an inductor L1 with one end connected to a drain or source terminal of S3 and to the cathode of diode D1. The other end of the inductor L1 is connected to the drain of S1 and anode of the diode D2. S3 is connected between the cathode of D1 and the positive DC input of the power converter 101. The configurable switch network preferably also comprises an output smoothing capacitor C1 connected from the DC output Vout to a neutral or ground rail 204 of the power converter 101 and an input smoothing capacitor C2 connected from the DC voltage input Vin to the neutral or ground rail 204.

The control circuit is configured to, via the control signals Control S1-3, switch the configurable switch network between a first operational mode and a second operational mode depending on the target or desired converter load voltage Vload, the DC input voltage and DC output voltage. The control circuit is configured or designed to select the first operational mode where the converter load voltage Vload is smaller than the DC input voltage which implies Vout is a positive voltage relative to circuit ground.

Figure 3:
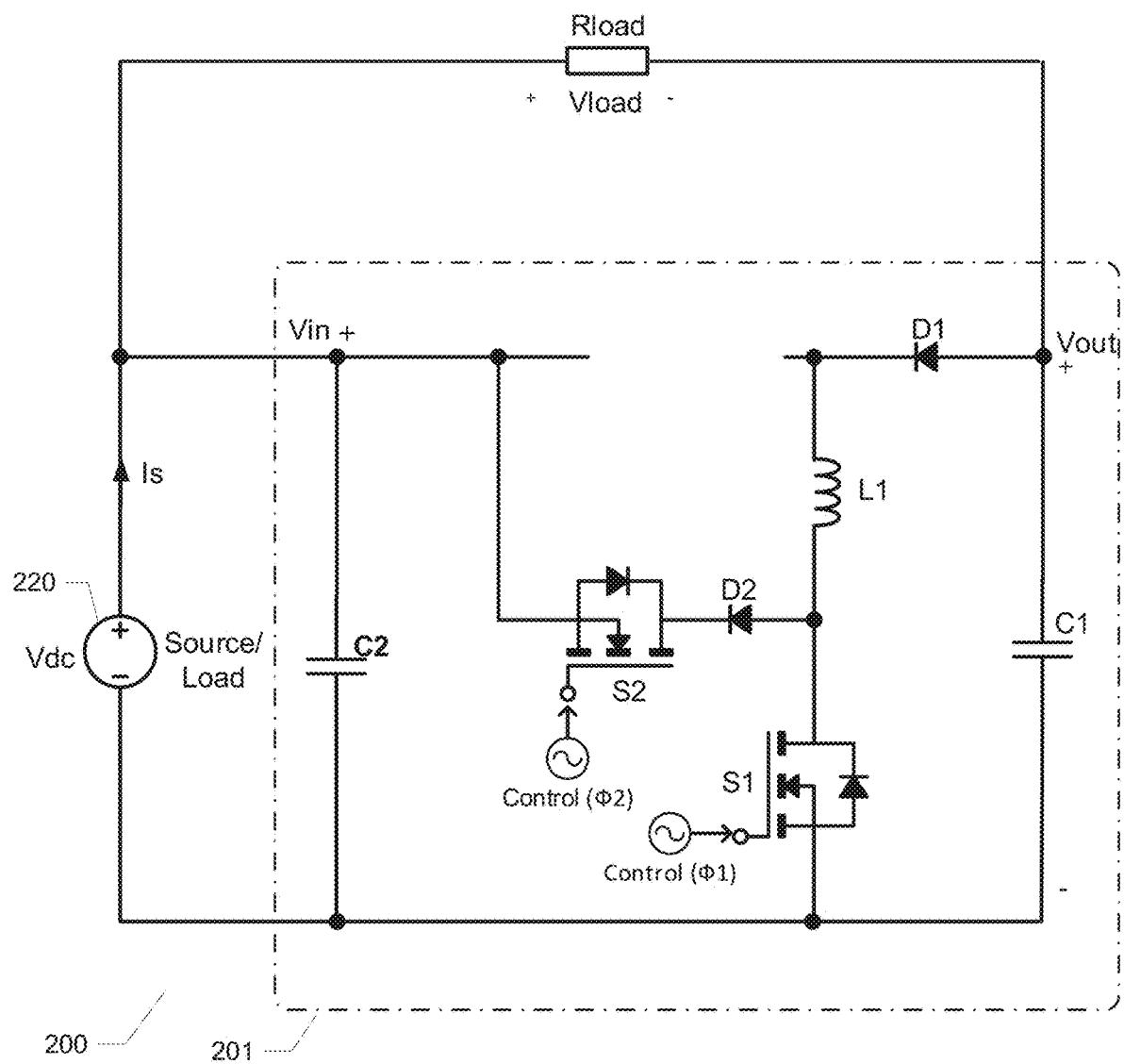
FIG. 3 shows a schematic circuit diagram of the first embodiment of the DC-DC power converter arranged in a first operational state.

FIG. 3 shows a an equivalent circuit diagram of the DC-DC power converter 201 arranged in the first operational mode where the third controllable semiconductor switch S3 is switched constantly to its off/non-conducting state, i.e. an open connection. The gate terminals of the first and second controllable semiconductor switches S1, S2 are driven by Control S1 and S2, respectively, which are complementary of the modulated control signal—for example PWM modulated control signals to provide duty-cycle based adjustment of Vout. Thereby, in the first operational mode of the configurable switch network the inductor L1 is charged from Vout through the first controllable semiconductor switch S1, and through the forward biased diode D1, in accordance with the first control signal PWM1 or ($\phi$1) of the complementary modulated control signals PWM1, PWM2. When the second control signal PWM2, which is complementary of PWM1, is active or logic high switch S1 is non-conducting while switch S2 is switched to its on/conducting state such that the current flowing through the inductor L1 is redirected into the positive input 203 of the DC-DC power converter 101 by passing through the conducting, and therefore low-resistance, state of S2. Accordingly, power is transferred from the output 208 to the input 203 of the DC-DC power converter 201 in its first operational state.

A more detailed explanation of the use of a first current charge path and current discharge path in the first operational state of the exemplary DC-DC power converter, that may be identical to the third embodiment of the DC-DC power converter 701, follows here:

If the DC input voltage Vdc>Vload, the DC-DC power converter 701 operates in boost mode corresponding to the first operational mode. The configurable switch network comprises five individually controllable semiconductor switches S1, S2, S2', S3 and S4 in the present embodiment of the power converter 701 while other embodiments may comprise fewer or additional controllable switches. Switches S3 and S4 are driven by complementary gate control signals that are preferably supplied by the control circuit such that switch S4 is always ON or conducting, and switch S3 is always OFF during, or in, the first operational mode. Switches S1 and S2 are driven by the complementary PWM gate control signals while switches S2 and S2' are driven by identical modulated gate control signals. The analysis below is based on inductor current continuous conduction mode (CCM) of the DC-DC power converter 701. When the load current Iload is negative, i.e. discharging the battery load through DC-DC power converter 701 into the DC input voltage source Vs, the control circuit turns on switch S2 and switch S2'—Thereby, the inductor L1 is charged via the first current charge path. Thereafter, the control circuit turns off switches S2 and S2', which induces an inductor current that is freewheeling through the first discharge current path through switch S1. The DC input voltage Vin supplied by DC input voltage source Vs is bucked down to the DC output voltage Vout. The first charge current path and discharge current paths are schematically illustrated on FIGS. 12A, 12B even though only the current paths inside the DC-DC power converter 701 are illustrated for simplicity.

Figure 12A:
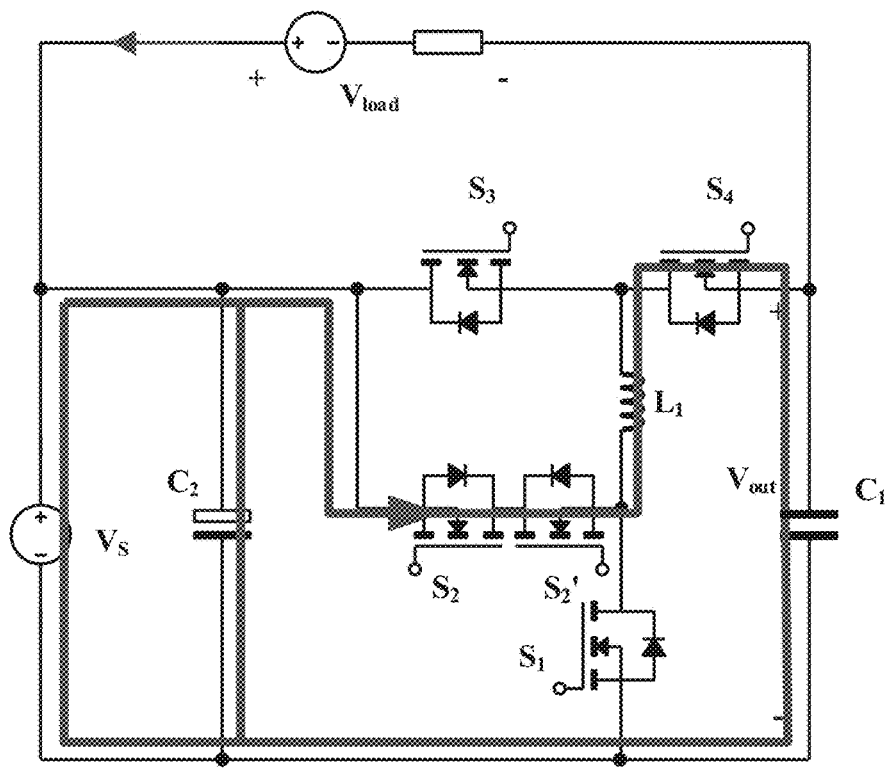
FIGS. 12A, 12B show current charge and current discharge paths through the third embodiment of the DC-DC converter assembly in the first operational mode when the load current Iload is negative.
Figure 12B:
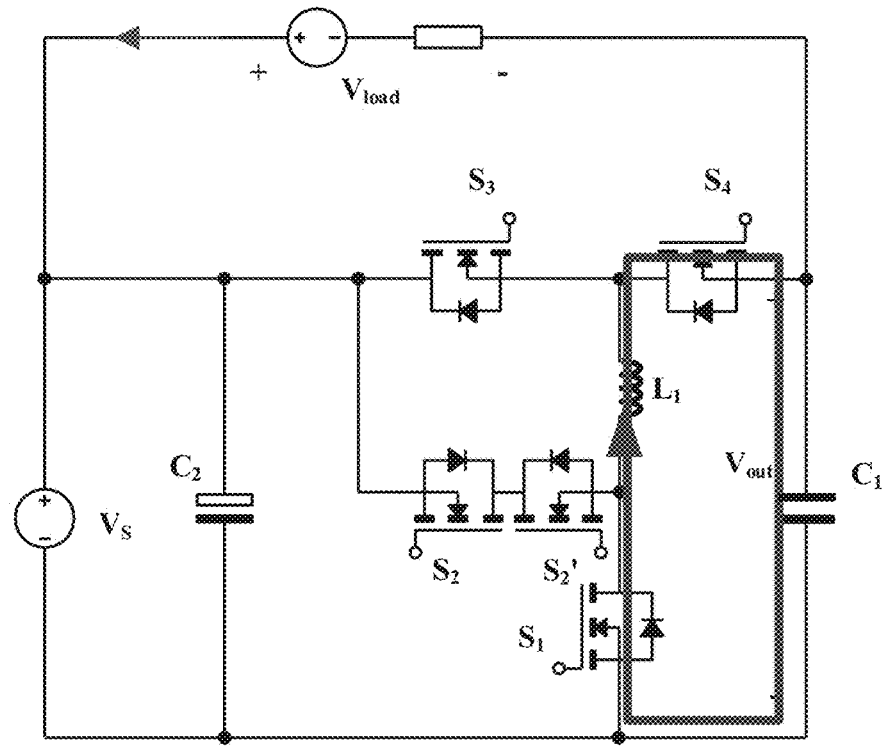

FIGS. 12A, 12B show current charge and discharge paths, respectively, when the load current Iload is negative in the first operational mode.

FIG. 12A illustrates how switches S2, S2', S4 are ON while switches S1 and S3 are OFF. FIG. 12B illustrates how switches S1 and S4 are ON while switches S2, S2' and S3 are OFF.

At positive load currents Iload in the first operational mode of the power converter 701 and assembly, i.e. charging the exemplary rechargeable battery pack load through DC-DC power converter 701 from the DC input voltage source Vs, the control circuit turns on switch S1 and the inductor L1 is charged through a third current charge path. The control circuit thereafter turns off switch S1 and turns on switches S2 and S2' which serve to discharge the inductor current through a third current discharge path which includes the conducting, or ON-state, switches S2 and S2'. This discharge action in turn boosts the voltage up from Vout to Vs. These current charge and discharge paths are shown on FIGS. 13A, 13B even though only the current paths inside the DC-DC power converter 701 are illustrated for simplicity.

Figure 13A:
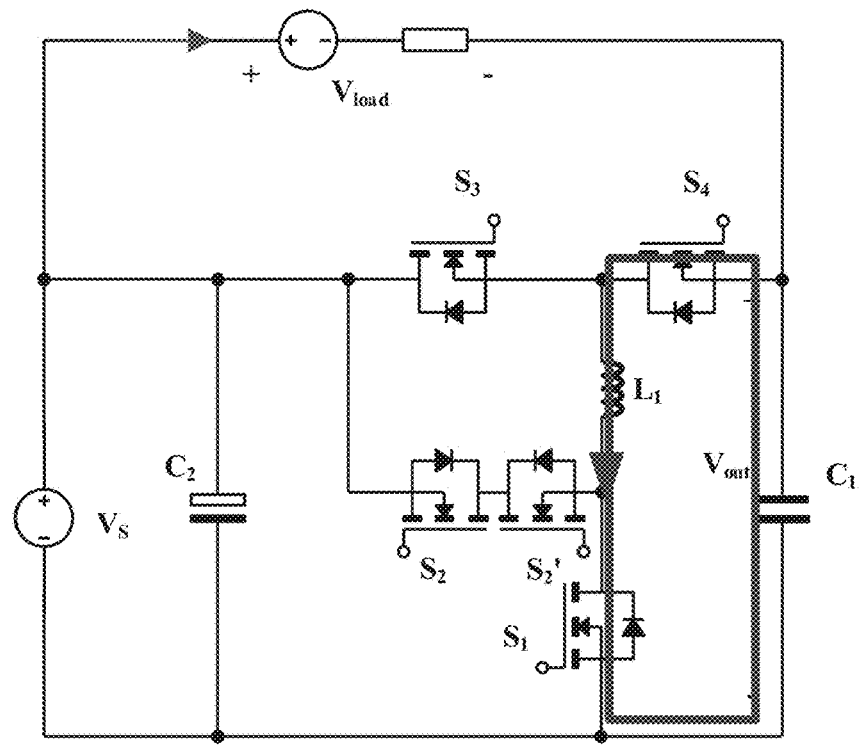
FIGS. 13A, 13B show current charge and current discharge paths through the third embodiment of the DC-DC converter assembly in the first operational mode when the load current Iload is positive.
Figure 13B:
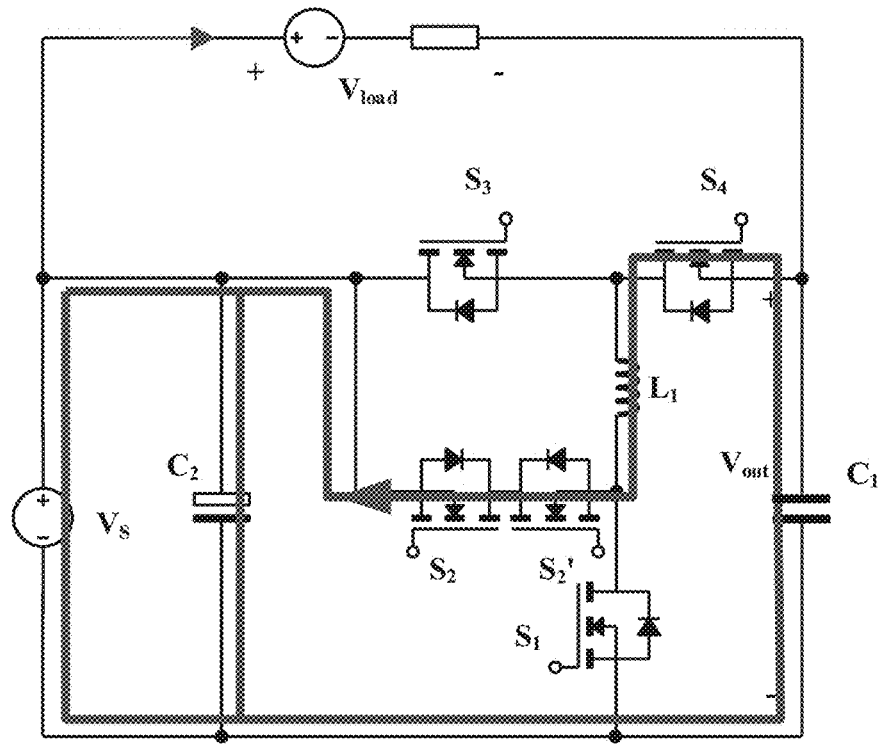

FIGS. 13A, 13B illustrate the charge and discharge current paths when the load current is positive in the first operational mode. FIG. 13A shows that S1 is ON and FIG. 13B shows that S2 and S2' are ON and S4 is ON while S1 is OFF.

In response to the DC input voltage Vs, corresponding to Vin, is smaller than the converter load voltage, Vload, the control circuit switches the DC-DC power converter 701 into the second operational mode which may comprise a buck-boost mode. Switches S3 and S4 are driven by the complementary modulated, e.g. PWM, control or gate drive signals. Switches S1 and S2 are driven by complementary modulated control or gate drive signals. Switches S2 and S2' are preferably driven by the same gate driving signals. Switch S1 is preferably always ON during the second operational mode of the power converter while switches S2 and S2' are preferably always OFF or non-conducting during the second operational mode. The analysis below is based on a preferred inductor current continuous conduction mode (CCM) of the power converter 701.

When the load current Iload is negative, i.e. discharging the rechargeable battery pack or cell based converter load through DC-DC converter 701 to the input voltage Vs, the control circuit is configured to turn ON switch S4 such that inductor L1 is charged through a second current charge path. The control circuit subsequently turns off switch S4 and turns on switch S3 that leads to a discharge of the inductor current through a second discharge path as illustrated on FIGS. 14A, 14B. At the same time, the inductor discharge current charges capacitor C2 from top to bottom. The current paths are shown in FIGS. 14A, 14B albeit only the charge and discharge current paths inside the DC-DC converter 701 are illustrated for simplicity.

Figure 14A:
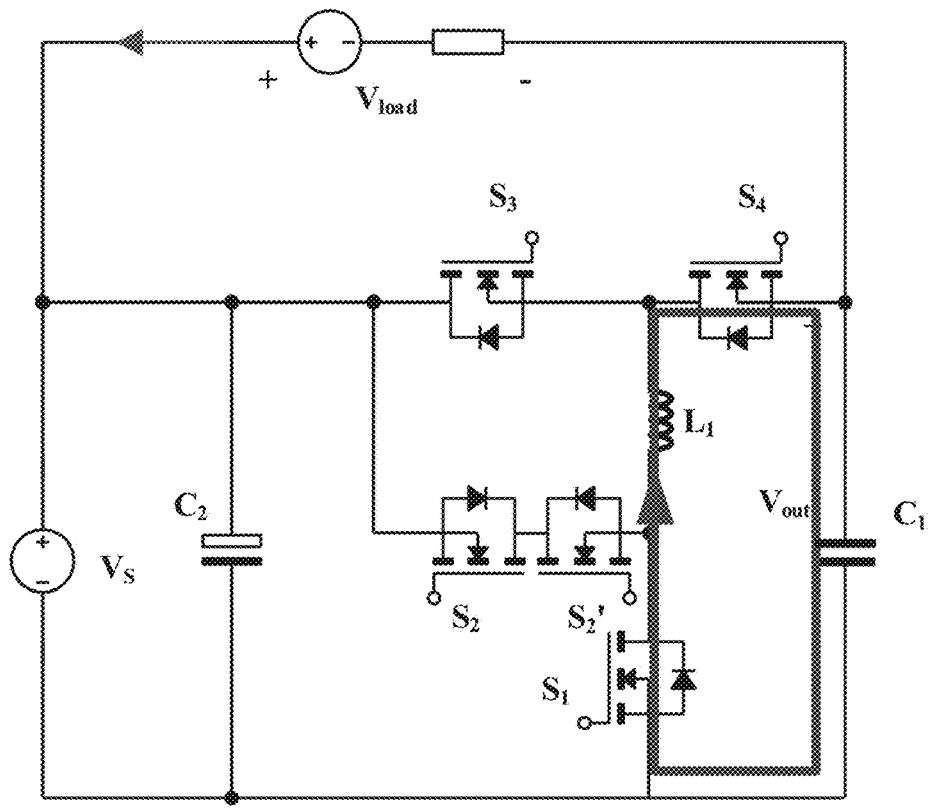
FIGS. 14A, 14B show current charge and current discharge paths through the third embodiment of the DC-DC converter assembly in the second operational mode at negative load current Iload.
Figure 14B:
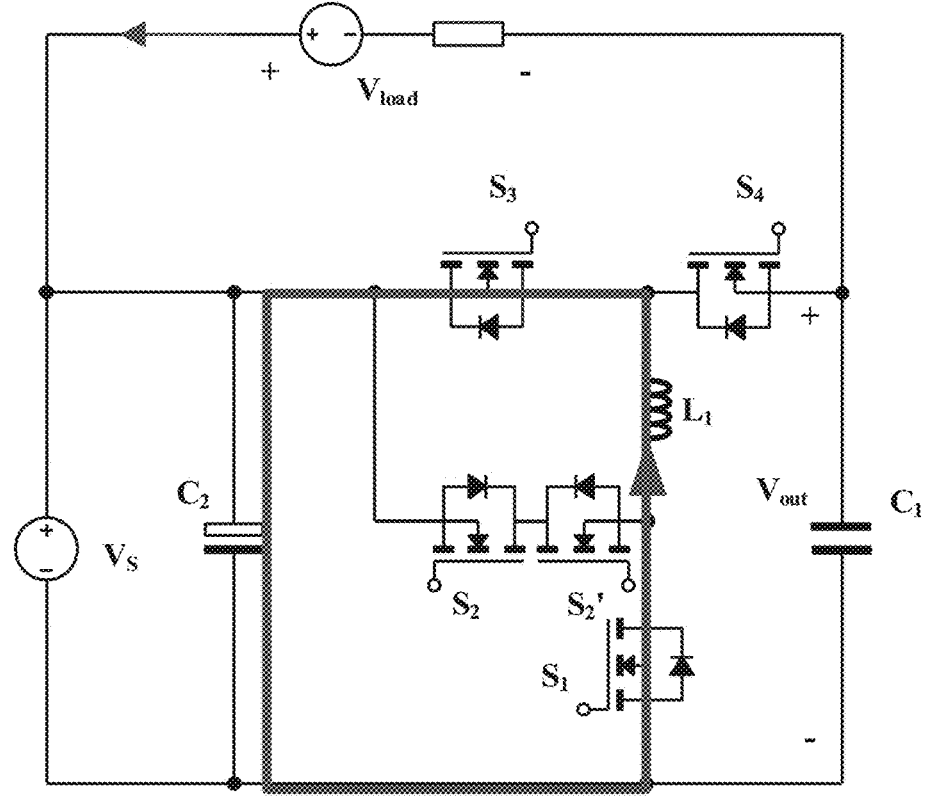

FIGS. 14A, 14B show charge current and discharge current paths in the second operational mode when the load current Iload is negative. FIG. 14A shows that switch S4 is on while FIG. 14B shows that switch S3 is on or conducting.

When the load current is positive, i.e. charging the battery through the DC-DC converter from Vs, the control circuit may turn on S3 to charge L1 in response; the control circuit may thereafter turn off S3 and turn on S4 such that inductor current in L1 is discharged through S4 and charges capacitor C1 (from bottom to top). The current paths are shown in FIG. 14A, B (only the current paths in the DC-Dc converter are illustrated for brevity.

Figure 15A:
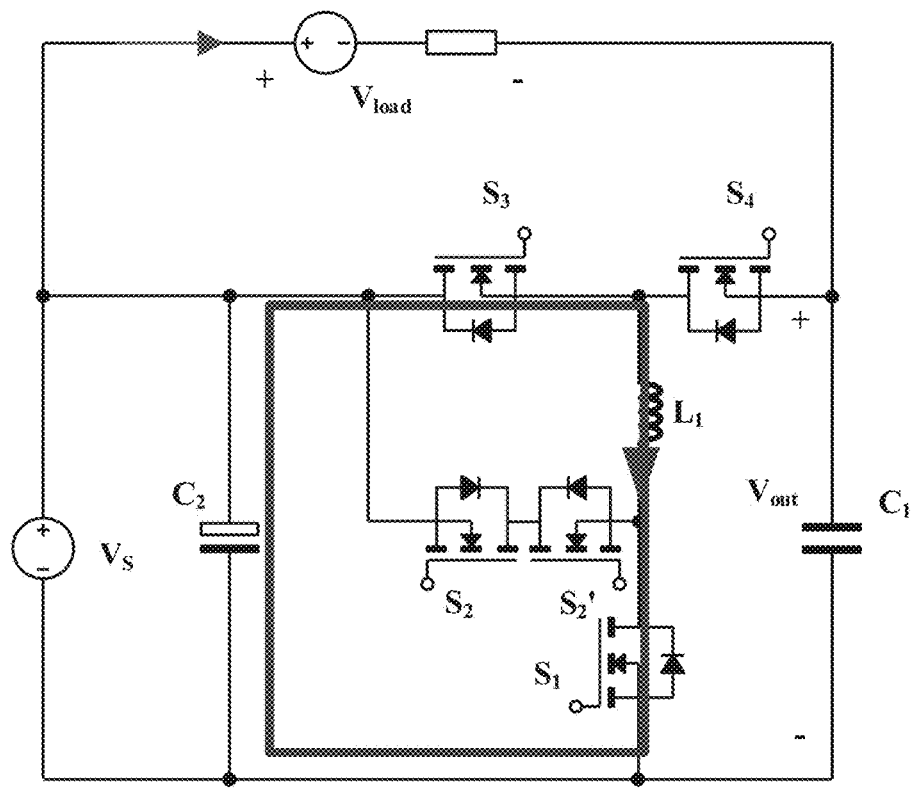
FIGS. 15A, 15B show current charge and current discharge paths through the third embodiment of the DC-DC converter assembly in the second operational mode at positive load current Iload.
Figure 15B:
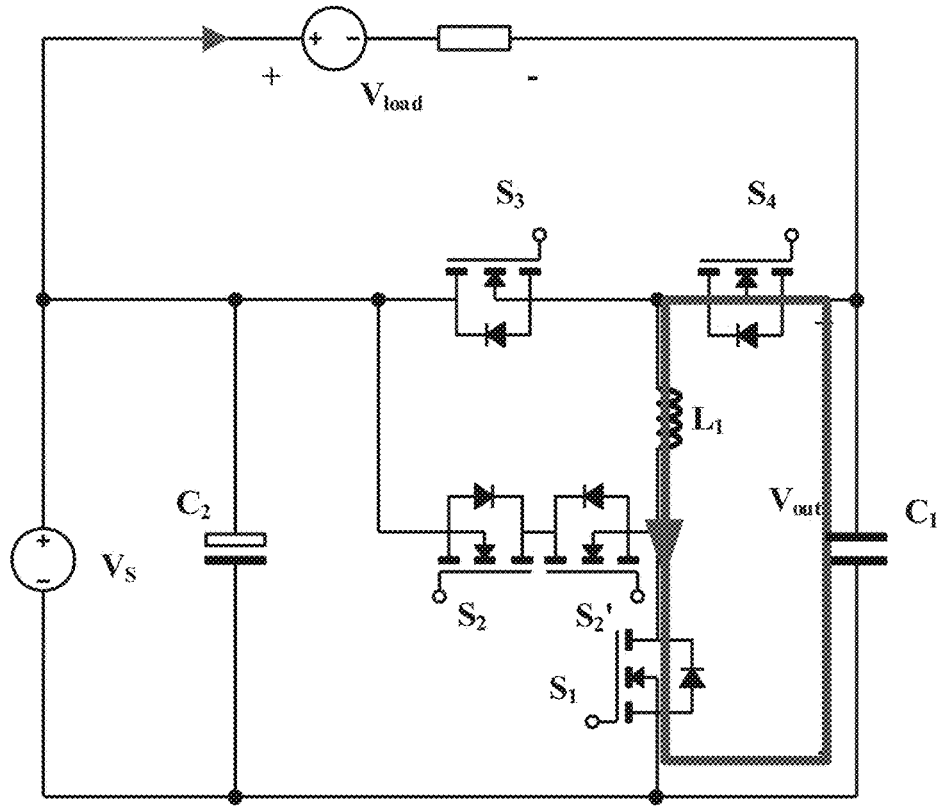

FIGS. 15A, 15B illustrate charge current and discharge current paths in the second operational mode when the load current Iload is positive. FIG. 15A shows that switch S3 is on and FIG. 15B shows that switch S4 is on.

Figure 4:
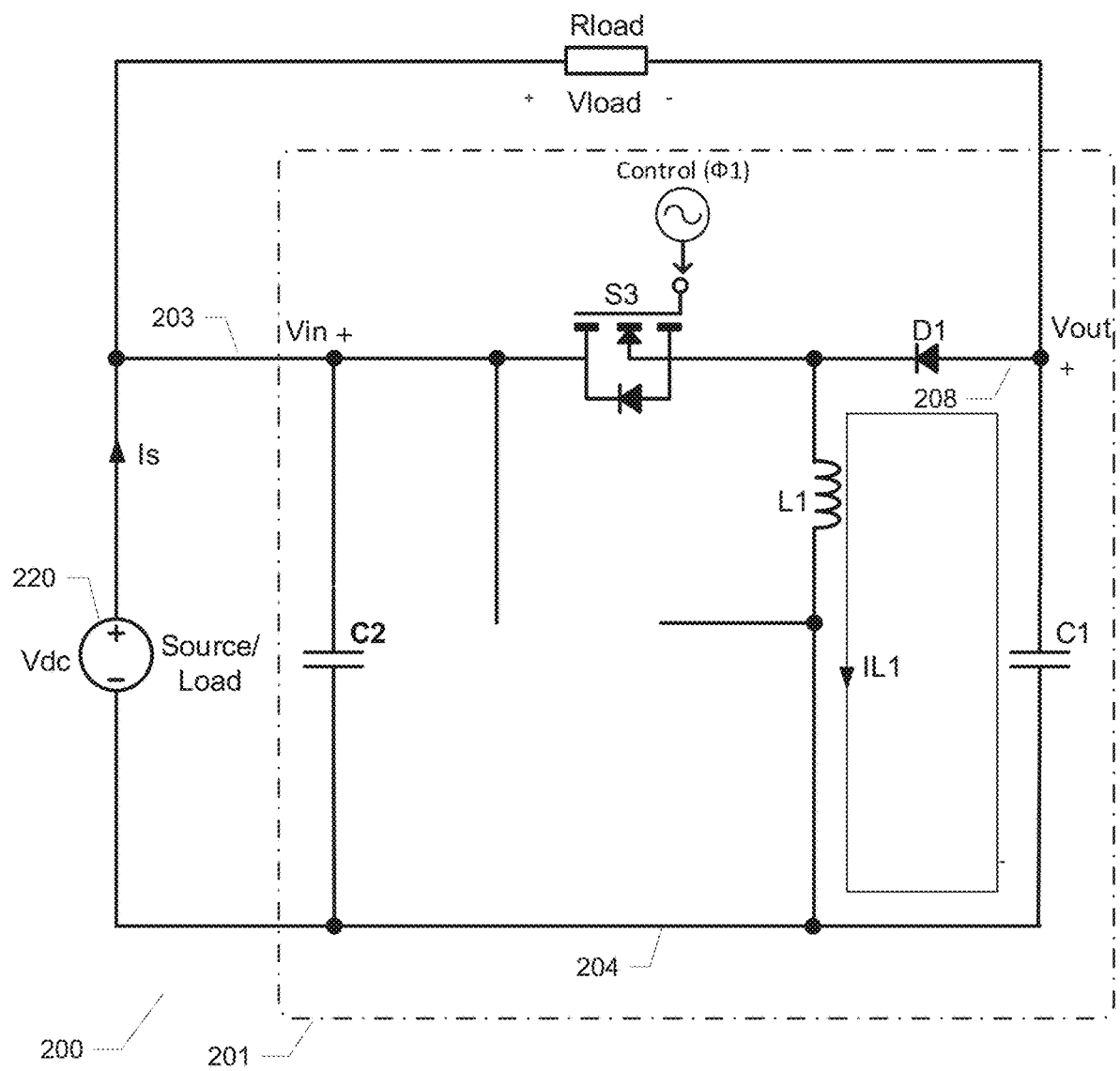
FIG. 4 shows a schematic circuit diagram of the first embodiment of the DC-DC power converter arranged in a second operational state.

Going back to the DC-DC power converter of FIG. 3 and FIG. 4, the control circuit is configured or designed to select the second operational mode in response to the converter load voltage Vload exceeds the DC input voltage. The latter condition implies that Vout is a negative voltage relative to circuit ground 204.

FIG. 4 shows an equivalent circuit diagram of the DC-DC power converter 201 arranged in the second operational mode where the first controllable semiconductor switch S1 is switched constantly to its on/conducting state, i.e. effectively acting as a short. The second controllable semiconductor switch S2 is switched constantly to its off/non-conducting state, i.e. effectively acting as an open circuit. The gate terminal of the third controllable semiconductor switch S3 is driven by Control S3 that is one of the complementary modulated control signals PWM1, PWM2 of the previously discussed modulated control signal. Thereby, in the second operational mode of the configurable switch network, when the switch S3 is on the inductor L1 is charged through a first current charge path running from the DC input voltage Vin through the small on-resistance of S3, and through a small on-resistance of the conducting switch S1. When the switch S3 is switched to its off/non-conducting state the current flowing through the inductor L1 is redirected, or discharged through a first current discharging path running through the ground connection 204 into the output capacitor C1 and into the positive output 208 of the DC-DC power converter as illustrated by current flow path IL1 so as to decreased the DC output voltage Vout. Accordingly, power is transferred from the input 203 to the output 208 of the DC-DC power converter 201 in its second operational state and the power converter is operated in boost-buck mode.

Figure 5:
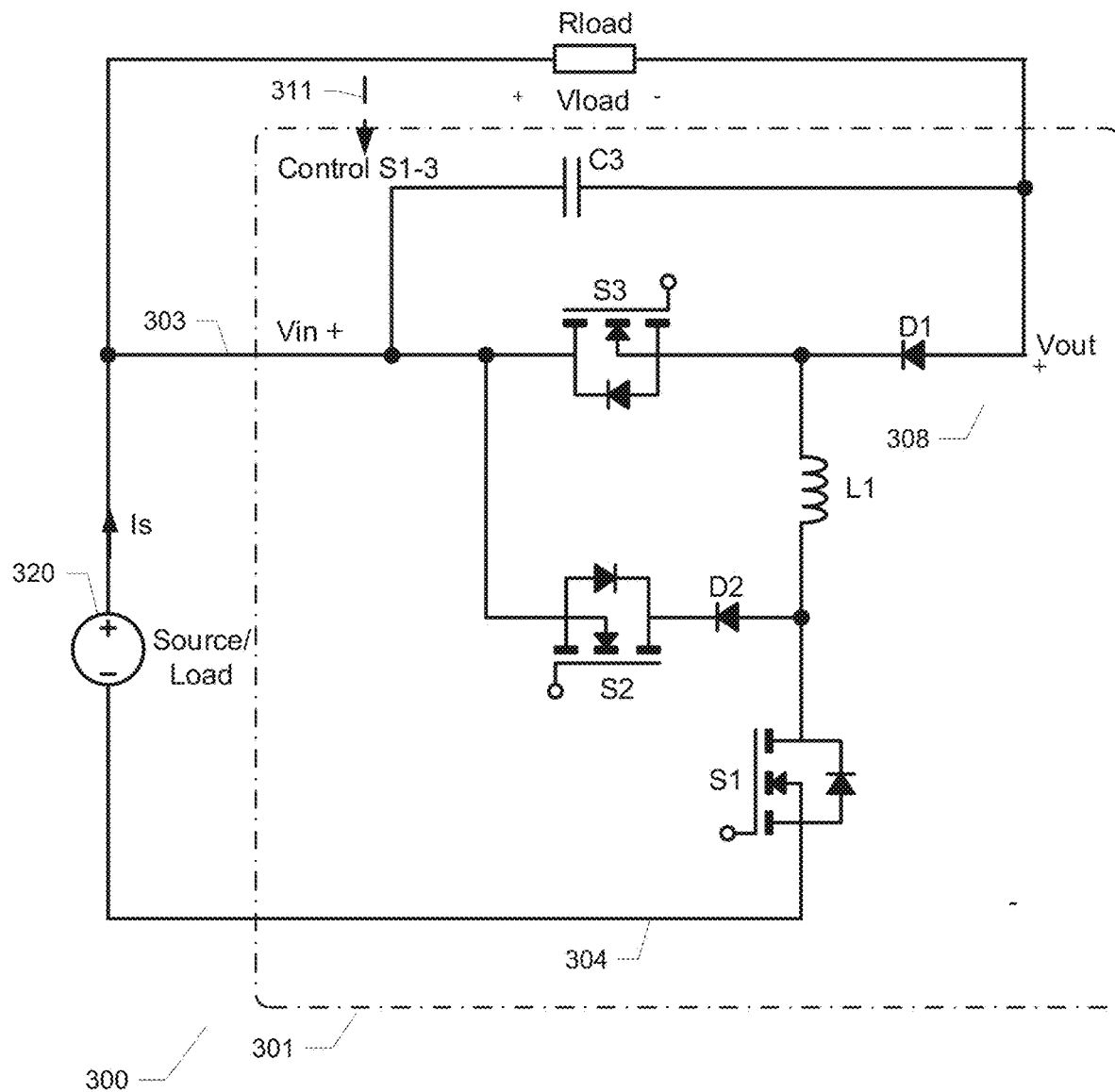
FIG. 5 shows a schematic circuit diagram of a second embodiment of a DC-DC power converter of the DC-DC converter assembly.

FIG. 5 shows a simplified circuit diagram of a second embodiment of the DC-DC power converter 101 of the DC-DC converter assembly 100 without details of the control circuit 113 for brevity. The converter load, Rload, and DC input voltage source/generator Vdc associated with the converter assembly 300 are included as well to clarify the interconnections. The functionality and topology of the DC-DC power converter 301 is largely identical to the previously discussed DC-DC power converter 201 except for the number and coupling of the input and output smoothing capacitors C1, C2. The latter smoothing capacitors are replaced by a single so-called flying capacitor C3 which is interconnected between the input Vin and output Vout of the DC-DC power converter 301.

Figure 6:
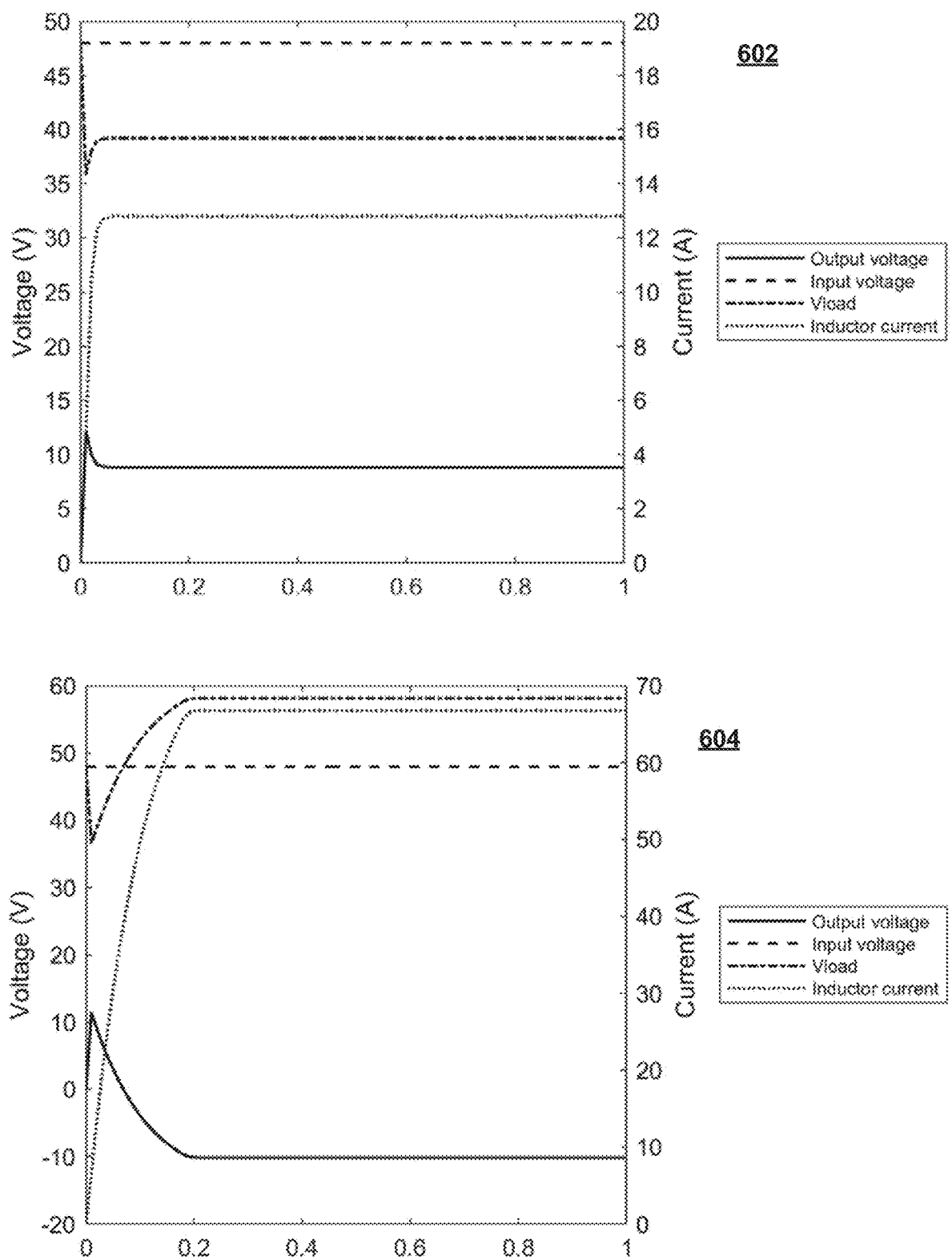
FIG. 6 shows two plots of various voltages, such the converter load voltage, of the DC-DC converter assembly over time.

The upper plot 602 of FIG. 6 shows a simulation of voltages and currents of the above-discussed first embodiment of the DC-DC converter assembly 200, 300, 700 operating in the first operational mode in response to the converter load voltage Vload is smaller than the DC input voltage Vin of the power converter 201.

The skilled person will understand that actual component values depend on target performance of the DC-DC power converter assembly, in particular current ripple/voltage ripple specifications. In certain useful embodiments of the DC-DC converter assembly 200, 300, 700 the switching frequency fsw may be between 50 kHz and 200 kHz, for example using C1=C2=47 µF, L1=100 µH.

As illustrated, the converter load voltage Vload is set to about 38 V and the DC input voltage Vin, as supplied by the DC input voltage source Vdc, is about 48 V which mean that the DC output voltage Vout of the converter is about 10 V in steady state operation after initial settling. In some embodiments (with inductor current being about 12.8 A, Vload being about 39.2V, and Vout being about 8.9V, the power delivery ratio between DC input source and converter output is about 5 to 1.

The lowermost plot 604 of FIG. 6 shows a simulation of voltages and currents of the above-discussed first embodiment of the DC-DC converter assembly 200 operating in the second operational mode where the converter load voltage Vload is larger than the DC input voltage Vin of the power converter 201. As illustrated, the converter load voltage Vload is set to about 58 V and the DC input voltage Vin, as supplied by the DC input voltage source Vdc, is about 48 V which means that the DC output voltage Vout of the converter is about −10 V in steady state operation after initial settling. In some embodiments (with inductor current being about 66.8 A, Vload being about 58.2V, and Vout being about −10.2V), the power delivery ratio between DC input source and converter output is about 6 to 1.

Figure 7:
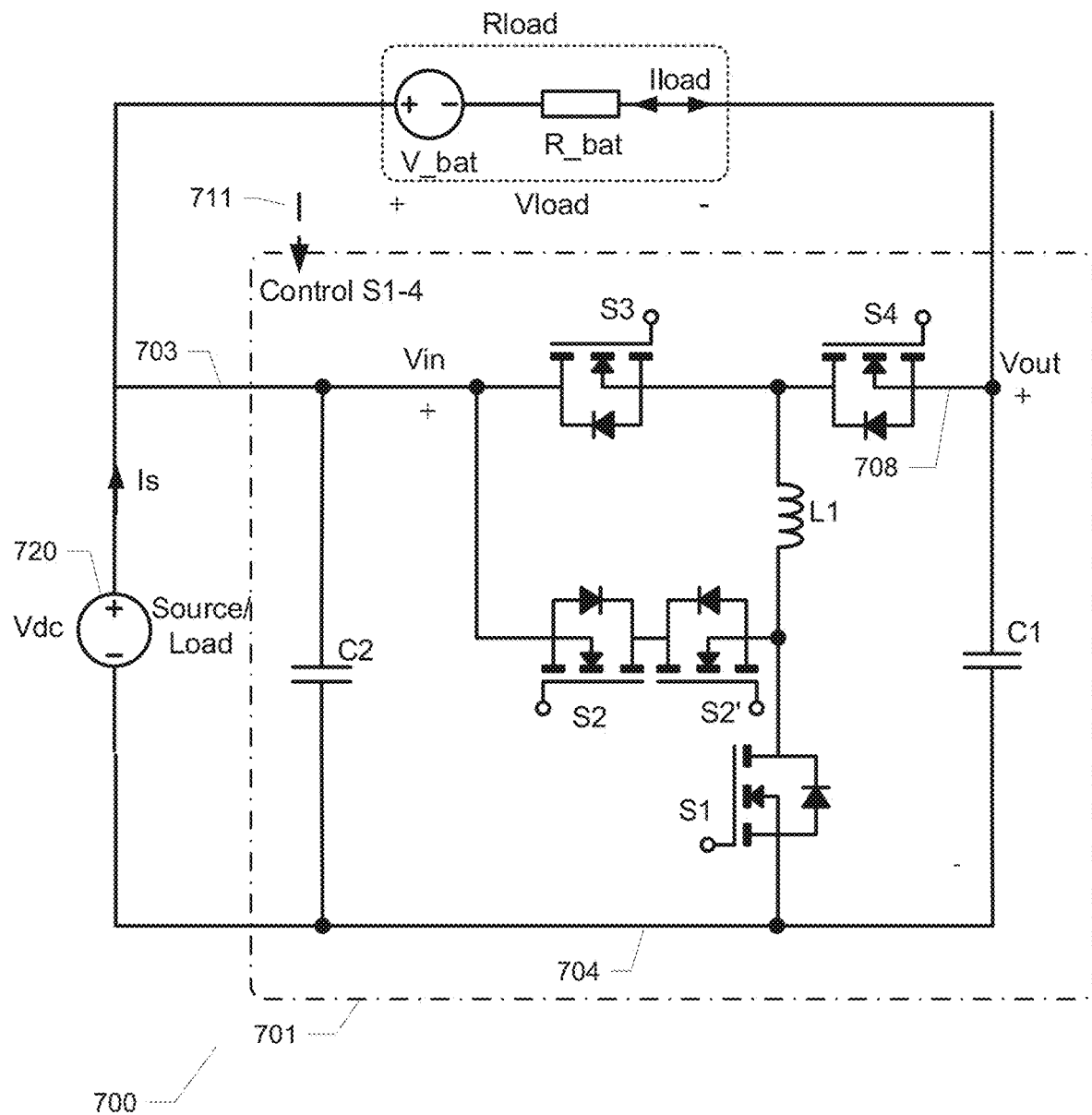
FIG. 7 shows a schematic circuit diagram of a third embodiment of the DC-DC power converter of the DC-DC converter assembly.

FIG. 7 shows a simplified circuit diagram of a third embodiment of the DC-DC power converter 101 of the DC-DC converter assembly 100 without details of the control circuit 113 for brevity. The converter load, Rload, and DC input voltage source/generator Vdc associated with the converter assembly 700 are included as well to clarify the interconnections. The converter load, Rload, may comprise a rechargeable battery bank or stack, Vbat, or similar energy storage element, with a certain internal resistance R_bat as schematically illustrated by the diagram. In numerous important applications, it is advantageous if the DC-DC power converter 701 supports both charging and discharging of the rechargeable battery bank from the DC input voltage source/generator Vdc as illustrated by bi-directional load/battery current Iload and depending on the charging state of the battery bank the converter load voltage by be larger or smaller than the DC input voltage Vin. Therefore, the DC-DC power converter 701 supports full bidirectional operation. The functionality and topology of the DC-DC power converter 701 is largely identical to the previously discussed DC-DC power converter 201 except for a replacement of the diode D1 with a fourth controllable semiconductor switch S4 in the configurable switch network and replacement of the diode D2 with a fifth controllable semiconductor switch S2'. The control circuit is modified accordingly to provide respective control signals, Control S1-S4, to gate terminals of the switches S1-S4.

When the DC-DC power converter 701 is arranged in, or switched to, its first operational mode, the gate terminals of the first and second controllable semiconductor switches S1, S2 are driven by Control S1 and S2, respectively, which preferably are complementary duty cycle modulated control signal. Furthermore, in the first operational mode, switch S3 preferably resides constantly in its non-conducting state, i.e. OFF, and switch S4 resides constantly in its conducting state, i.e. ON. Switches S2 and S2' may be driven by identical modulated control signal and identical switching patterns, i.e. S2 on=S2' on, S2 off=S2' off. Alternatively, a bit more complex switching may be utilized if S2 is constant ON in the first operational mode. S3 is constantly non-conducting and S4 is preferably constantly conducting to provide a charge and/or discharge path for L1. The switches S2 and S2' may be connected with common drain or alternatively connected with common source. The latter connection may simplify the control circuit of the switches S2 and S2' as they could share a single isolated gate driver power supply.

When the DC-DC power converter 701 operates in its second operational mode, the gate terminals of the third and fourth switches S3, S4 are driven by Control S3 and S4, respectively, which may be complementary phases ($\phi1$, $\phi2$) of the previously discussed modulated control signal, while switch S2 resides constantly in its non-conducting state and switch S1 resides constantly in its conducting state. Switch S2' should also reside constantly in its non-conducting state because switch S2 resides constantly in its non-conducting state.

Figure 11:
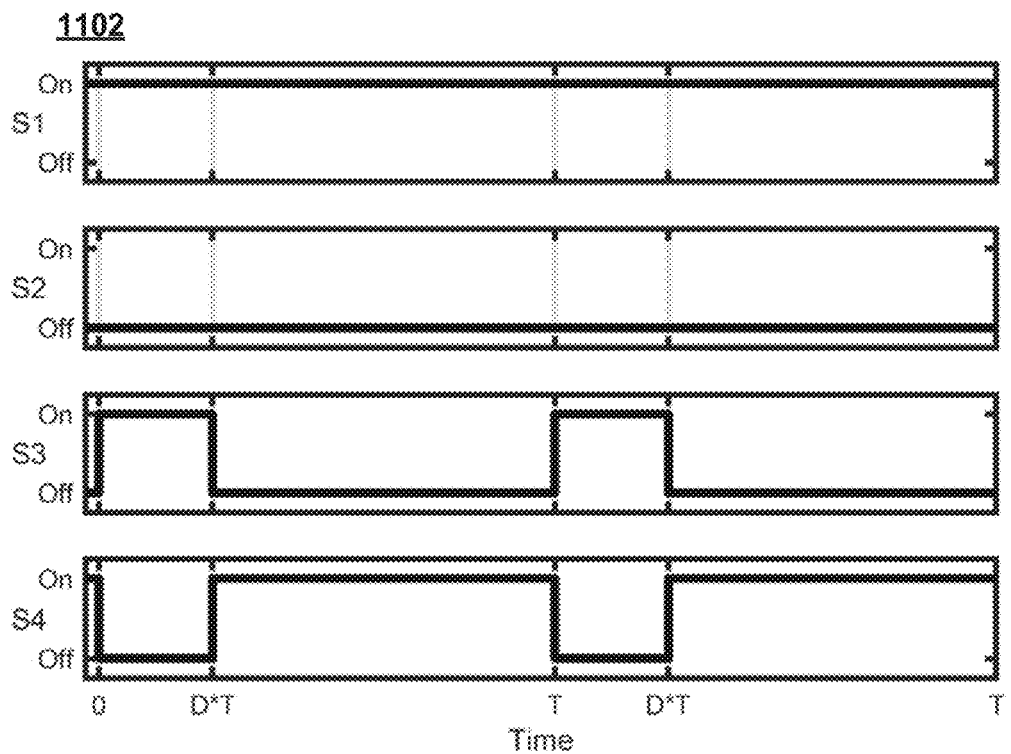
FIG. 11 shows plots of respective control signals over time of a plurality of controllable semiconductor switches of the configurable switch network of the DC-DC power converter according to the fourth embodiment thereof.
Figure 11:
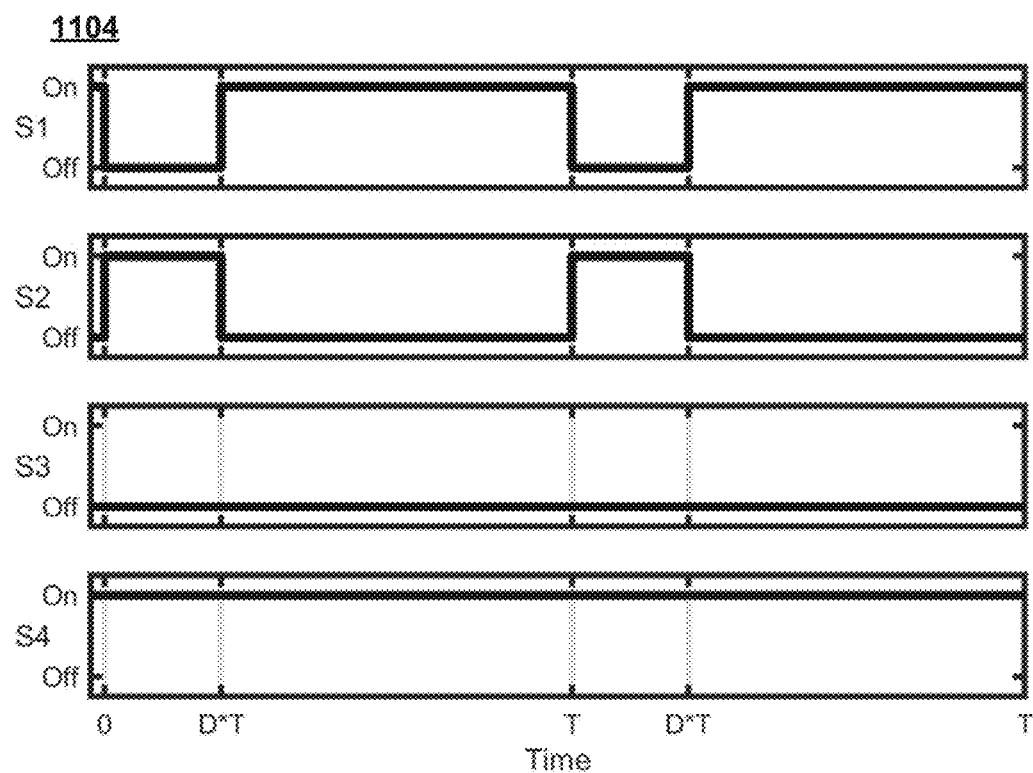
Figure 11A:
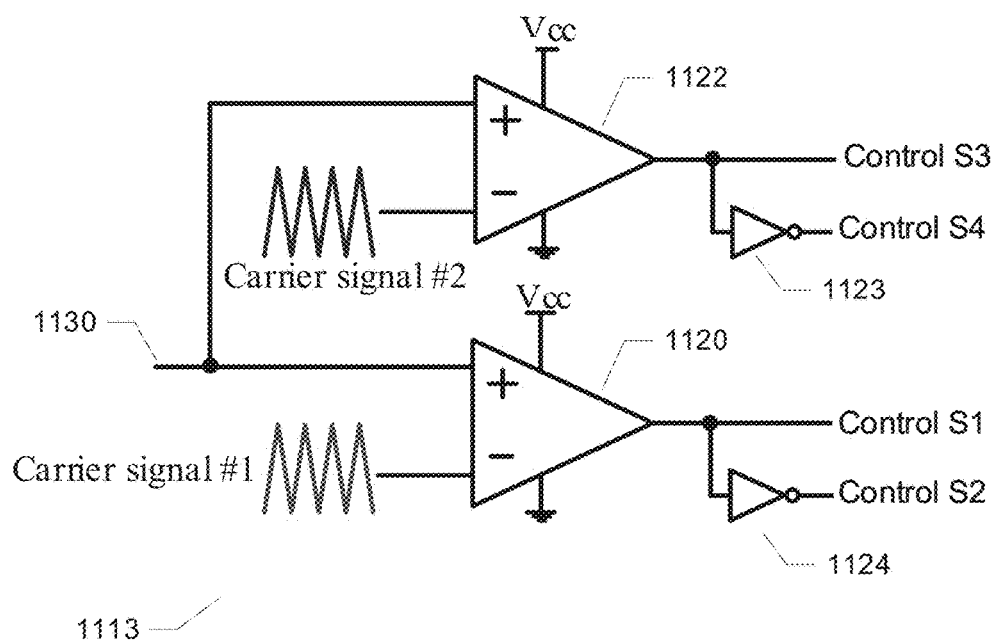
FIG. 11A shows an exemplary embodiment of a modulator circuit of a control circuit of the DC-DC converter assembly.

FIG. 11A shows an exemplary embodiment of a modulator 1113 of the control circuit 113 which may be utilized in any of the previously disclosed DC-DC power converters 201, 301, 701. The modulator 1113 is configured to generate the respective modulated control signals, Control S1, S2, S2' S3, S4, to the respective gate terminals of the switches S1, S2, S2', S3 and S4 in a manner which provides seamless switching between the first and second operational modes of the DC-DC power converter as needed in response to requirements for positive and negative DC output voltages Vout. The seamless switching between the first and second operational modes is achieved through the use of an intermediate output voltage region, as defined below, which comprises a modified switching pattern between the first and second operational modes. The intermediate output voltage region ensures that the DC-DC power converters can dynamically switch between positive and negative load/output currents without generating undesired spikes or noise in Vout or the load current. The intermediate output voltage region is defined as a pre-set output voltage range between small positive and small negative values of Vout, e.g. between +1 V and −1V or similar predetermined upper and lower level thresholds that are substantially smaller than a nominal DC output voltage of the power converter assembly.

Figure 11B:
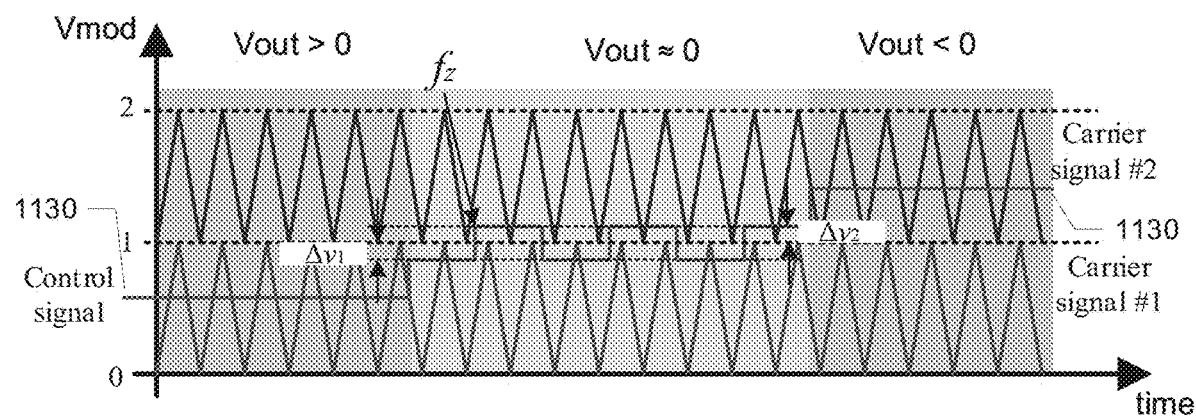
FIG. 11B shows carrier signals and first and second sets of modulated control signals generated by the modulator circuit for application to switches of the configurable switch network.

The control circuit 113 preferably comprises first and second comparators 1120, 1122. The first comparator 1120 generates a first set of pulse width modulated (PWM) control signals, Control S1, S2, as complimentary signals via an inverter 1123. The second comparator 1122 generates a second set of pulse width modulated control signals, Control S3, S4, as complimentary signals via a second inverter 1124. A first carrier signal, denoted carrier signal #1, which may have a frequency corresponding to the previously discussed switching frequency fsw of the DC-DC power converter, is applied to one input of the first comparator 1120. A dynamic reference signal 1130, as illustrated on FIG. 11B, is applied to the second, or other, input of the first comparator 1120. A second carrier signal, denoted carrier signal #2, is applied to a first input of the second comparator 1122 while the dynamic reference signal 1130 is applied to the second, or other, input of the second comparator 1122. The first and second carrier signals preferably have identical frequency, peak-peak voltage or current amplitudes and phases, but are mutually DC offset e.g. with a predetermined offset voltage. The predetermined offset voltage preferably corresponds to a peak-peak voltage of the first or second carrier signal, e.g. schematically illustrated as "1" on FIG. 11B but may in a practical circuit implementation correspond to a voltage between 2 and 20 Volts. In this manner, a peak voltage of the first carrier signal is substantially equal to a minimum voltage of the second carrier signal as schematically illustrated by the respective waveforms of the first and second carrier signals on FIG. 11B.

The respective waveforms of the first and second carrier signals and the dynamic reference signal 1130 of the control circuit 113 within the intermediate output voltage region is schematically illustrated on FIG. 11B by the coloured region under Vout=0. The respective waveforms of the first and second carrier signals and the dynamic reference signal 1130 within a normal output voltage region with large positive Vout using the first operational mode of the power converter is schematically illustrated on FIG. 11B by the left-most coloured region under Vout>0. Likewise, the respective waveforms of the first and second carrier signals and the dynamic reference signal 1130 within a normal output voltage region with large negative Vout, e.g. larger than the predetermined lower level threshold, using the second operational mode of the power converter is schematically illustrated on FIG. 11B by the right-most coloured region under Vout<0. The skilled person will appreciate that the level of the dynamic reference signal 1130 relative to the respective levels of the first and second carrier signals within the normal output voltage region Vout>0 ensures that merely the first set of pulse width modulated control signals, Control S1, S2, are actively modulated while the second set of pulse width modulated control signals, Control S3, S4, are inactive to render the switches S3, S4 in constant non-conducting state and conducting state, respectively, as previously discussed. Conversely, the level of the dynamic reference signal 1130 relative to the respective levels of the first and second carrier signals within the normal output voltage region Vout<0 ensures that merely the second set of pulse width modulated control signals, Control S3, S4, are actively modulated while the first set of pulse width modulated control signals, Control S1, S2, are inactive to render the corresponding switches S1, S2 in constant conducting state and non-conducting state, respectively.

The dynamic reference signal 1130 within the intermediate output voltage region under Vout≈0 is dynamically switched between the mid-level voltage, "1", with voltage amplitude steps of $\Delta v_1$ and $\Delta v_2$ at a control frequency of $f_z$. The modulation frequency of $f_z$ may be at least 3 times smaller, e.g. between 5 and 20 times smaller, than the switching frequency of the DC-DC power converter. The control frequency of $f_z$ is preferably higher than 15 kHz or 20 kHz to avoid audible buzz or noise. The size of $\Delta v_1$ is utilized to set or determine a maximum duty cycle, e.g. 90% or 95%, of the pulse width modulated control signal Control S1. The setting of the maximum duty cycle is helpful to prevent driving the duty cycle into a range close 100% where practical component limitations and parasitics of the switches S1-S4, comparators 1120, 112 etc. make the actual duty cycle uncertain and hence leads to uncontrolled voltage spikes and anomalies in the pulse width modulated control signals Control S1-S4 and/or uncontrolled voltage spikes and anomalies in the output voltage and/or load current of the DC-DC power converter. In a similar manner, the size of $\Delta v_2$ is utilized to set or determine a minimum duty cycle, e.g. 5% or 10%, of the pulse width modulated control signal Control S3 with corresponding advantages.

In this manner, the above-mentioned characteristics of the dynamic reference signal 1130 within the intermediate output voltage region, where Vout is close to zero, ensures that the DC-DC power converter toggles in a well-controlled manner between the first and second operational modes at the control frequency of $f_z$.

Figure 8:
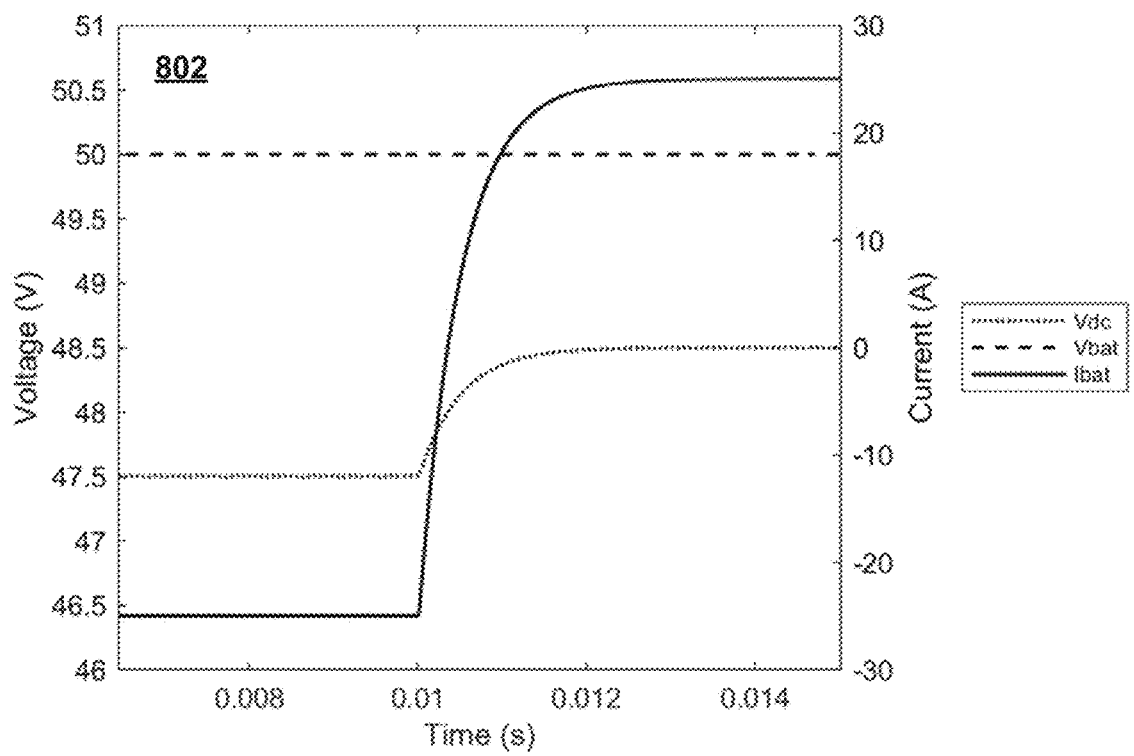
FIG. 8 shows two plots over time of converter load current, and various voltages, of the DC-DC converter assembly according to the third embodiment thereof.
Figure 8:
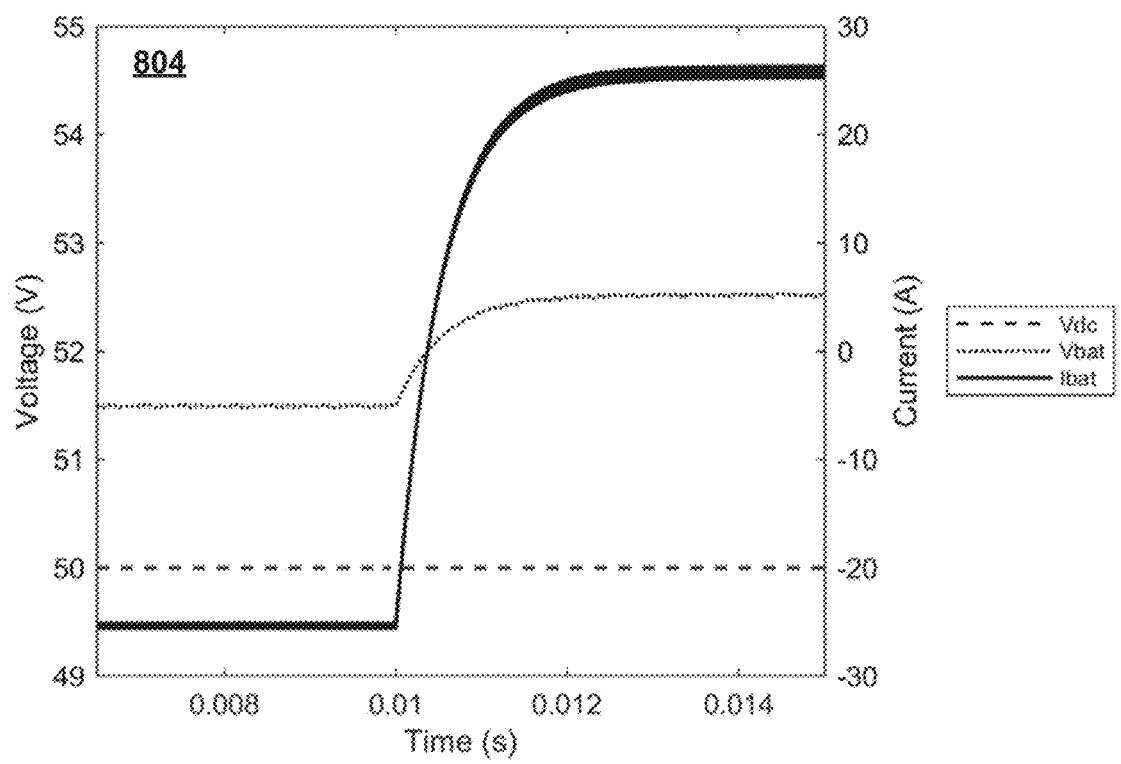

The upper plot 802 of FIG. 8 shows a simulation of voltages and currents of the above-discussed third embodiment of the DC-DC converter assembly 700 operating in the first operational mode where the converter load voltage Vload is smaller than the DC input voltage Vin of the power converter 701. As illustrated, the converter load voltage Vload is set to about 48 V and the DC input voltage Vin, as supplied by the DC input voltage source Vdc, is constantly about 50 V which means that the DC output voltage Vout of the converter is about 2.5 V in steady state operation after initial settling. The plot of the converter load current Iload, marked by legend Ibat due to the battery pack load, illustrates the bidirectional load current supply capability of the power converter 701 operating in the first operational mode where Iload in a gradual and well-controlled manner changes direction e.g. transits from negative to positive over time, i.e. from about −25 A at t=0 to about +25 A at t=0.015 s. This current direction switching capability is controlled by the control circuit (not shown) via appropriate control of the respective control signals, Control S1-S4, to the gate terminals of the switches S1-S4.

The lowermost plot 804 of FIG. 8 shows a simulation of voltages and currents of the above-discussed third embodiment of the DC-DC converter assembly 700 operating in the second operational mode where the converter load voltage Vload is larger than the DC input voltage Vin of the power converter 701. As illustrated, the converter load voltage Vload is set to about 51.5–52 V and the DC input voltage Vin, as supplied by the DC input voltage source Vdc, is constantly about 50 V which means that the DC output voltage Vout of the converter is about minus 1.5 V in steady state operation after initial settling. The plot of the converter load current Iload, marked by legend Ibat as in plot 802 illustrates the bidirectional load current supply capability of the power converter 701 operating in the second operational mode where Iload gradually and well-controlled changes direction e.g. transits from negative to positive over time, i.e. from about −26 A at t=0 to about +26 A at t=0.015 s. This current direction switching capability is controlled by the control circuit (not shown) via appropriate control of the respective control signals, Control S1-S4, to the gate terminals of the switches S1-S4.

Figure 9:
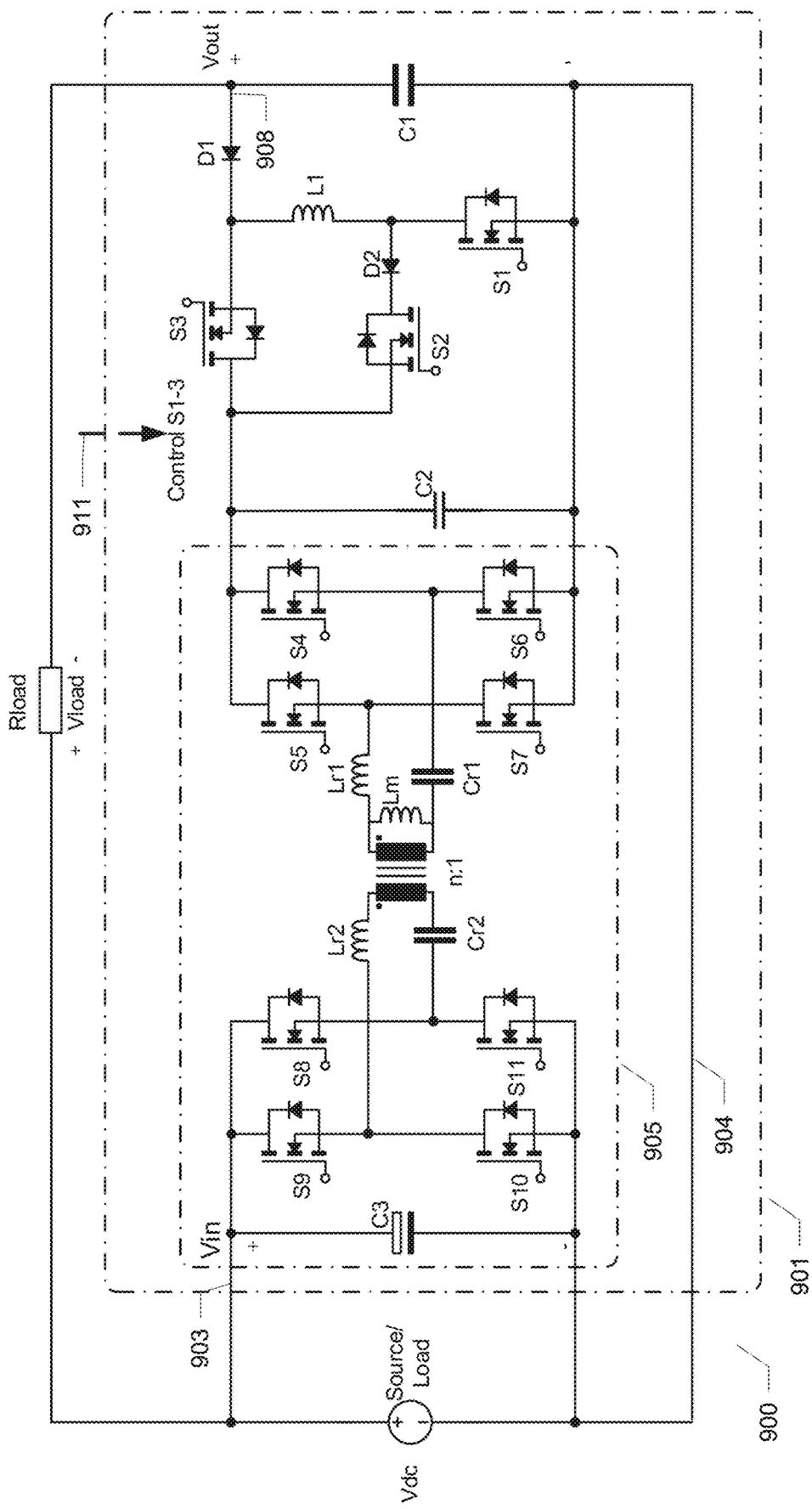
FIG. 9 shows a schematic circuit diagram of a fourth embodiment of the DC-DC power converter of the DC-DC converter assembly.

FIG. 9 shows a simplified circuit diagram of a fourth embodiment of the DC-DC power converter 101 of the DC-DC converter assembly 100 without details of the control circuit 113 for brevity. The converter load, Rload, and DC input voltage source/generator Vdc associated with the converter assembly 900 are included as well to clarify the interconnections. Compared to the first DC-DC power converter embodiment 201 as discussed above, the present DC-DC power converter 901 comprises an additional resonant DC-DC converter stage or circuit 905 connected in series with the positive input 903 the DC-DC power converter 901 and preferably infront of the configurable switch network which, as in the previously discussed embodiments may comprise a plurality of interconnected individually controllable semi-conductor switches S1, S2 and S3 and diodes D1, D2 or corresponding active diodes. Hence, the functionality and topology of the configurable switch network may be largely identical to anyone of those of the previously discussed DC-DC power converters.

The resonant DC-DC converter stage 905 is configured to step-up the DC input voltage with a predetermined boost or buck factor or DC amplification which relaxes boost or buck factor requirements of the configurable switch network. This allows the modulated control signal to operate with a smaller variation of the modulation index relaxing accuracy requirements of the modulated control signals and component stresses of active components of the DC-DC power converter 901.

The resonant DC-DC converter stage 905 is preferably configured to operate in so-called zero voltage switching (ZVS) or zero current switching (ZCS) mode at a resonant frequency of a resonant tank comprising tank inductances Lr2, Lm and Lr1 and tank capacitors Cr1, Cr2. The ZVS or ZCS mode decreases power dissipation of one or more controllable semiconductor switches S8, S9, S10, S11, such as IGBT switches or MOSFET switches, of a full-bridge, or H-bridge, input driver connected to a primary side winding of transformer. The transformer may have a step up ratio, n, between 2 and 100 e.g. between 5 and 25.

The resonant DC-DC converter stage 905 comprises a second H-bridge or full-bridge rectifier comprising controllable semiconductor switches S4, S5, S6, S7 coupled between a secondary side winding of the transformer and an input voltage of the configurable switch network across smoothing capacitor C2. The skilled person will understand that the configurable switch network may be driven by modulated control signals 911 that are identical to those of previously discussed modulated control signals 111, 211, 311, in particular using the same switching frequency, while the resonant DC-DC converter stage 905 may be operated at the same switching frequency or at a different switching frequency, in particular a switching frequency that maximizes the power or energy efficiency of the resonant DC-DC converter stage 905. The switching frequency of the resonant DC-DC converter stage 905 may accordingly be set to a frequency at, or close to, the resonant frequency of the resonant tank.

Figure 10:
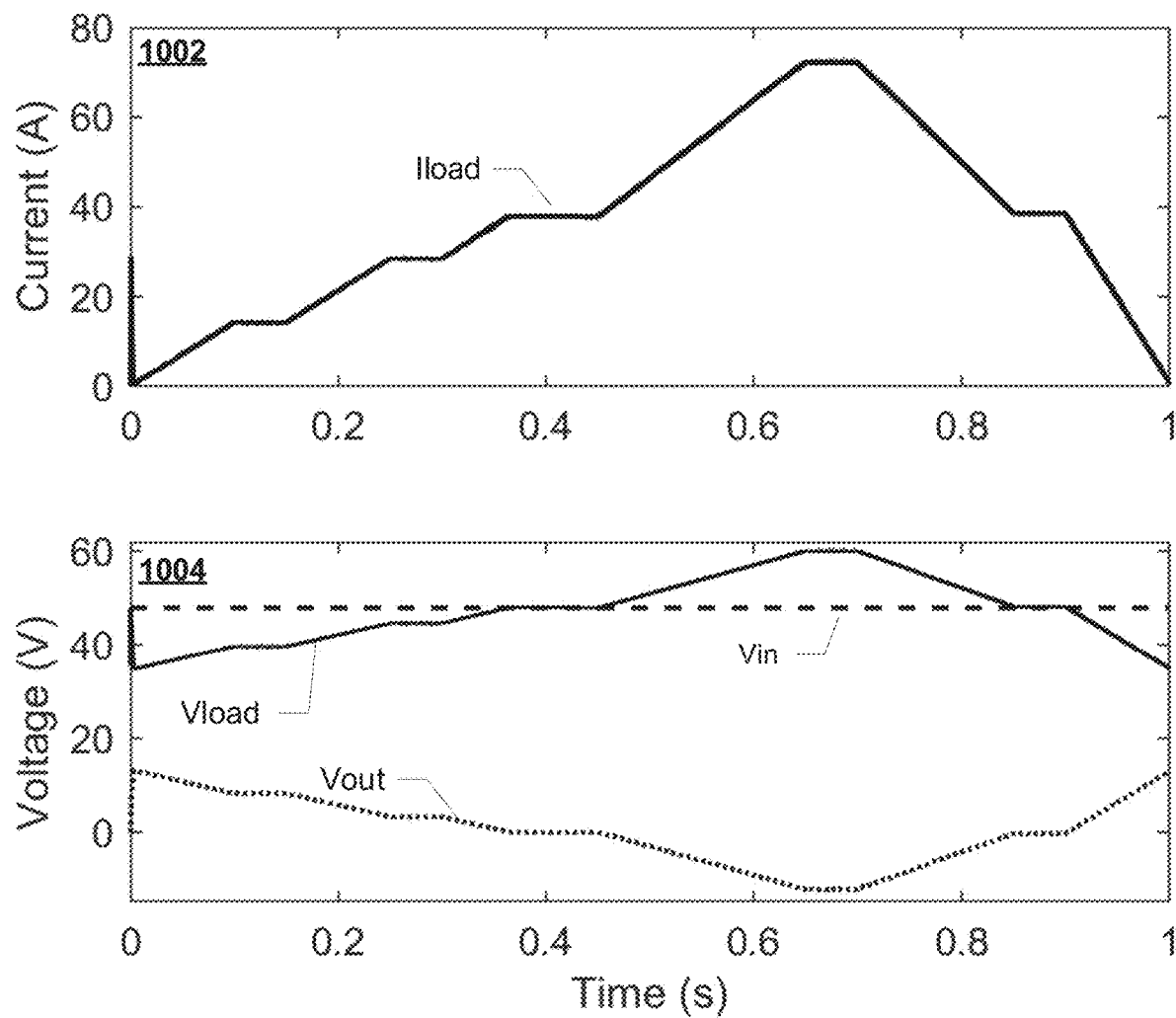
FIG. 10 shows plots over time of converter load current, and various converter voltages, of the DC-DC converter assembly according to the fourth embodiment thereof.

The upper plot 1002 of FIG. 10 shows a simulation of load current Iload in the converter load, Rload, in form of one or more rechargeable batteries or a rechargeable battery pack of the above-discussed fourth embodiment of the DC-DC converter assembly 900 for changing load voltage Vload as illustrated by plot 1004. As illustrated, using increasing load current leads to increasing load voltage Vload due to the internal resistance of the rechargeable battery or batteries. The increase in load voltage Vload results in a lower output voltage.

The lower plot 1004 of FIG. 10 shows a simulation of voltages and currents of the above-discussed fourth embodiment of the DC-DC converter assembly 900 seamlessly and dynamically switching between the first operational mode, where the converter load voltage Vload is smaller than the DC input voltage Vin of the power converter 901, and the second operational mode, where the converter load voltage Vload is larger than the DC input voltage Vin. As illustrated, Vin remains fixed at about 50 V over the plotted time span of about 1 s while the converter load voltage Vload, as defined by the previously discussed Vref input to the control circuit 113 (refer to FIG. 1) increases from about 38 V at t=0 to 60 V peaking at t=0.7 s. As illustrated by plot 1004, the DC output voltage Vout of the converter 901 changes polarity seamless at about t=0.4 S and varies from about from about +15 V at t=0 to about −10 V at t=0.7 s.

The upper plot 1102 of FIG. 11 shows the respective control signals Control S1-4 applied to the individually controllable semiconductor switches S1, S2, S3 and S4 of the configurable switch network of the previously discussed third embodiment of the DC-DC power converter 701 operating in the second operational mode where the converter load voltage Vload is larger than the DC input voltage leading to a negative Vout voltage. As discussed before, in the second operational mode switch S1 is constantly arranged in its on/conducting state while switch S2 is constantly in its off/non-conducting state as indicated by the respective levels of the control signals. The modulated control signal Control S3 is applied to the gate terminal of switch S3 and a complementary modulated control signal Control S4/D1 is applied to the gate terminal of the switch S4.

The lower plot 1104 of FIG. 11 shows the respective control signals Control S1-4 applied to the individually controllable semiconductor switches S1, S2, S3 and S4 of the configurable switch network of the previously discussed third embodiment of the DC-DC power converter 701 operating in the first operational mode where the converter load voltage Vload is smaller than the DC input voltage leading to a positive Vout voltage. As discussed before, in the first operational mode switches S1 and S2 are driven by complementary phases ($\phi 1$, $\phi 2$) of the modulated control signals Control S1 and S2, respectively. The switch S3 is constantly arranged in its off/non-conducting state and switch S4 is constantly arranged in its on/conducting state as indicated by the level of the associated gate control signals S3 and S4/D1, respectively.

REFERENCES

1. Kim, N., & Parkhideh, 8. "PV-Battery Series Inverter Architecture: A Solar Inverter for Seamless Battery Integration with Partial-Power DC-DC Optimizer". IEEE Transactions on Energy Conversion. https://doi.org/10.1109/TEC.2018.2873664 2018 (Early Access).
2. Button, Robert M. "An Advanced Photovoltaic Array Regulator Module." (1996) Print.
3. Xue, Fei, Ruiyang Yu, and Alex Huang. "Fractional Converter for High Efficiency High Power Battery Energy Storage System." 2017 IEEE Energy Conversion Congress Exposition (2017), pp 5144-5150.
4. Iyer, Vishnu Mahadeva et al. "Extreme Fast Charging Station Architecture for Bectric Vehicles with Partial Power Processing." Applied Power Electronics Conference and Exposition (apee), Annual Ieee Conference (2018). pp. 659-665.
5. Mira Albert, Maria del Carmen, Zhe Zhang, and Michael A E. Andersen, "Analysis and Comparison of De/De Topologies Partial Power Processing Configuration for Energy Storage Systems." Proceedings of 2018 International Power Electronics Conference (2018).
6. Series connected converter for control of multi-bus spacecraft power utility, Raymond F. Beach, Andy Brush, US08550324, U.S. Pat. No. 5,623,398A.
7. Series connected buck-boost regulator, Arthur G Birchenough, U.S. Pat. No. 10,629,875, US704219981, US1118896283.
8. WO 2019/076874 A1; A DC-DC Converter Assembly; Kevin Tomas Manez, Jeremy Alexander Anthon, Zhe Zhang.

The invention claimed is:
1. A DC-DC converter assembly comprising:
a DC-DC power converter configured to convert a DC input voltage supplied by a DC input voltage source into a DC output voltage in accordance with at least first and second modulated control signals, and
a converter load electrically connected in series with the DC-DC power converter such that the DC input voltage source supplies power directly to the converter load without passing through the DC-DC power converter;
said DC-DC power converter comprising:
a control circuit configured to adjust the DC output voltage or current in accordance with a target DC voltage or a DC target current, respectively, and a configurable switch network configured to switch the DC-DC power converter between:
  a first operational mode for generating a DC output voltage of a first polarity using a first current charge path and first current discharge path of the configurable switch network to provide a converter load voltage smaller than the DC input voltage, the generating the DC output voltage of the first polarity comprising selectively charging an inductor from the DC output voltage through a first switch in accordance with the first modulated control signal and discharging the inductor into the input of the DC-DC power converter through a second switch in accordance with the second modulated control signal, and
  a second operational mode for generating a DC output voltage of a second polarity, opposite to the first polarity, using a second current charge path and second current discharge path of the configurable switch network to provide a converter load voltage that is larger than the DC input voltage, the generating the DC output voltage of the second polarity comprising charging the inductor from the DC input voltage through a third switch in accordance with one of the first or second modulated control signals and discharging the inductor into the DC output voltage in accordance with the other of the first or second modulated control signals.

2. The DC-DC converter assembly according to claim 1, wherein the control circuit is configured to switch the configurable switch network between the first operational mode and second operational mode depending on the target DC voltage or target DC current, the DC input voltage and the DC output voltage.

3. The DC-DC converter assembly according to claim 1, wherein the configurable switch network comprises a plurality of interconnected individually controllable semi-conductor switches configured to:
  during the first operational mode:
  selectively charge the inductor from the DC output voltage through a first controllable semiconductor switch in accordance with the first modulated control signal and discharge the inductor into the input of the DC-DC power converter through a second controllable semiconductor switch in accordance with the second, and complimentary, modulated control signal, and
  placing a third controllable semiconductor switch constantly in a non-conducting state and placing a fourth controllable semiconductor switch constantly in a conducting state; and
  during the second operational mode:
  placing the first and second controllable semiconductor switches constantly in a conducting state and non-conducting state, respectively, and
  charging the inductor from the DC input voltage through the third controllable semi-conductor switch in accordance with the one of the first or second complimentary modulated control signals and discharge the inductor into the first or second polarity DC output voltage in accordance with the other one of first and second complimentary modulated control signals.

4. The DC-DC converter assembly according to claim 3, wherein the control circuit comprises a modulator configured to generate the first or second complimentary modulated control signals at respective outputs of first and second comparators of the modulator; said modulator comprising:
  a carrier signal generator configured to generate first and second mutually offset carrier signals at a switching frequency of the DC-DC power converter,
  the first comparator having a first input connected to the first carrier signal and second input connected to a dynamic reference signal; and
  the second comparator having a first input connected to the second carrier signal and a second input connected to the dynamic reference signal;
  wherein the control circuit is configured to switch between first and second operational modes by adjusting a voltage or level of the dynamic reference signal.

5. The DC-DC converter assembly according to claim 4, wherein the control circuit is configured to adjust the voltage or level of the dynamic reference signal at a predetermined control frequency, within a predetermined intermediate output voltage region around 0 V of the DC-DC power converter; said control frequency being at least 3 times smaller than the switching frequency of the DC-DC power converter.

6. The DC-DC converter assembly according to claim 1, wherein the DC-DC power converter comprises:
  at least one capacitor connected between the positive input and positive output of the DC-DC power converter; or
  an input capacitor connected between the positive input and negative input of the DC-DC power converter and an output capacitor connected between the positive output and negative output of the DC-DC power converter.

7. The DC-DC converter assembly according to claim 1, wherein the DC-DC power converter is configured to operate in current continuous conduction mode.

8. The DC-DC converter assembly according to claim 3, wherein the configurable switch network is electrically connected between an input and an output of the DC-DC power converter.

9. The DC-DC converter assembly according to claim 3, wherein the configurable switch network further comprises:
  a first passive diode connected in series with the inductor and the first controllable semiconductor switch between the positive and negative outputs of the DC-DC pow er converter to provide, during the first and second operational modes, a first charge path for charging the inductor in accordance with the first modulated control signal; and
  a second passive diode coupled in series with the inductor and the second controllable semiconductor switch to the positive input the DC-DC power converter to pro-vide, during at least the first operational mode, the first discharge path for discharging the inductor in accordance with the second modulated control signal.

10. The DC-DC converter assembly according to claim 3, wherein the configurable switch network further comprises:
  a first active diode, for example comprising a fourth controllable semiconductor switch, connected in series with the inductor and the first controllable semiconductor switch between the positive and negative outputs of the DC-DC power converter to provide, during the first and second operational modes, a first charge path for charging the inductor in accordance with first modulated control signal; and
  a second active diode, for example comprising a fifth controllable semiconductor switch, coupled in series with the inductor and the second controllable semiconductor switch to the positive input the DC-DC power converter to provide, during at least the first operational mode, a first discharge path for discharging the inductor during the second phase of the modulated control signal.

11. The DC-DC converter assembly according to claim 3, wherein the DC-DC power converter further comprises:
a resonant DC-DC converter stage coupled in series with the positive input of the DC-DC power converter and configured to step-up the DC input voltage with a predetermined boost factor.

12. The DC-DC converter assembly according to claim 11, wherein the resonant DC-DC converter stage comprises:
a first full-bridge or half-bridge rectifier coupled between the DC input voltage of the DC-DC power converter and a primary side winding of a transformer; and
a second full-bridge or half-bridge rectifier coupled between a secondary side winding of the transformer and the input voltage of the configurable switch network.

13. The DC-DC converter assembly according to claim 1, wherein at least one of the converter load and the DC input voltage source comprises an inverter or a battery pack with a plurality of rechargeable battery cells.

14. The DC-DC converter assembly according to claim 13, wherein at least one of the converter load and the DC input voltage source comprises an inverter connectable to a single phase mains grid or a multi-phase mains grid.

15. The DC-DC converter assembly according to claim 1, wherein the DC-DC power converter is configured for bidirectional operation to additionally transfer power from the converter load directly to the DC input voltage source without passing through the power DC-DC converter.

16. A method of supplying power to a converter load of a DC-DC converter assembly using a DC-DC power converter, comprising:
connecting a DC input voltage source to an input of the DC-DC power converter to provide a DC input voltage thereto,
adjusting a DC output voltage or current at an output of the DC-DC power converter by a control circuit in accordance with the DC input voltage, the DC output voltage and a target DC voltage or target DC current, respectively;
selectively switching a configurable switch network of the DC-DC power converter between:
a first operational mode for generating a first polarity DC output voltage to provide a converter load voltage smaller than the DC input voltage, the generating the first polarity DC output voltage comprising selectively charging an inductor from the DC output voltage through a first switch in accordance with a first modulated control signal and discharging the inductor into the input of the DC-DC power converter through a second switch in accordance with a second modulated control signal; and
a second operational mode for generating a second polarity, opposite to the first polarity, DC output voltage to provide a converter load voltage larger than the DC input voltage, the generating the second polarity DC output comprising charging the inductor from the DC input voltage through a third switch in accordance with one of the first modulated control signal or the second modulated control signal and discharging the inductor into the DC output voltage in accordance with the other of the first modulated control signal or the second modulated control signal.

17. The method of supplying power to a converter load of a DC-DC converter assembly using a DC-DC power converter according to claim 16, further comprising:
during the first operational mode: charging the inductor from the DC output voltage through a first controllable semiconductor switch in accordance with the first modulated control signal and discharging the inductor into the input of the DC-DC power converter in accordance with the second modulated control signal, and
switching a third controllable semiconductor switch constantly to a non-conducting state; and
during the second operational mode: maintaining the first and second controllable semiconductor switches constantly in a conducting state and non-conducting state, respectively, and
charging the inductor from the DC input voltage through the third controllable semi-conductor switch in accordance with the first modulated control signal and discharging the inductor, through the negative output, into the first or second polarity output of the DC-DC power converter in accordance with the second modulated control signal.

* * * * *